(12) United States Patent
Symons et al.

(10) Patent No.: US 8,527,879 B2
(45) Date of Patent: Sep. 3, 2013

(54) DIGITAL MEDIA EDITING INTERFACE USING A SUPERCURSOR FOR SELECTING MEDIA CLIPS FOR EDITING

(75) Inventors: Gary Mark Symons, Kelowna (CA); Kirk David Symons, Kelowna (CA)

(73) Assignee: Vericorder Technology Inc., Kelowna (CA)

( * ) Notice: Subject to any disclaimer, the term of this patent is extended or adjusted under 35 U.S.C. 154(b) by 121 days.

(21) Appl. No.: 13/138,008

(22) PCT Filed: Dec. 23, 2009

(86) PCT No.: PCT/CA2009/001875
§ 371 (c)(1),
(2), (4) Date: Jun. 23, 2011

(87) PCT Pub. No.: WO2010/071996
PCT Pub. Date: Jul. 1, 2010

(65) Prior Publication Data
US 2011/0258547 A1  Oct. 20, 2011

Related U.S. Application Data

(60) Provisional application No. 61/203,384, filed on Dec. 23, 2008.

(51) Int. Cl.
*G06F 3/00* (2006.01)
*G09G 5/00* (2006.01)
*G09G 5/22* (2006.01)

(52) U.S. Cl.
USPC ........... 715/723; 715/731; 345/651; 345/652; 345/440.1

(58) Field of Classification Search
USPC ................. 715/723, 731, 716; 345/619, 651, 345/440.1
See application file for complete search history.

(56) References Cited

U.S. PATENT DOCUMENTS

| | | | | |
|---|---|---|---|---|
| 5,682,326 A | * | 10/1997 | Klingler et al. | 715/202 |
| 5,838,317 A | * | 11/1998 | Bolnick et al. | 715/764 |
| 2008/0209066 A1 | * | 8/2008 | Spio et al. | 709/231 |

* cited by examiner

*Primary Examiner* — Doug Hutton, Jr.
*Assistant Examiner* — Li Sun
(74) *Attorney, Agent, or Firm* — Antony C. Edwards

(57) ABSTRACT

An editing method includes: detecting a selection of first and second clip portions of a source media depiction, generating corresponding first and second block icons and snapping hands-free the first and second block icons across the screen to a linear queue so that the blocks are snugly adjacent, detecting a move of the first or second block icon relative to one another substantially along the queue, and if the first or second block icon overlaps the other by substantially one half of the other block icon, reversing displayed positions in the queue of the first and second block icons.

28 Claims, 17 Drawing Sheets

VIDEO USING BUNGEE BLOCKS

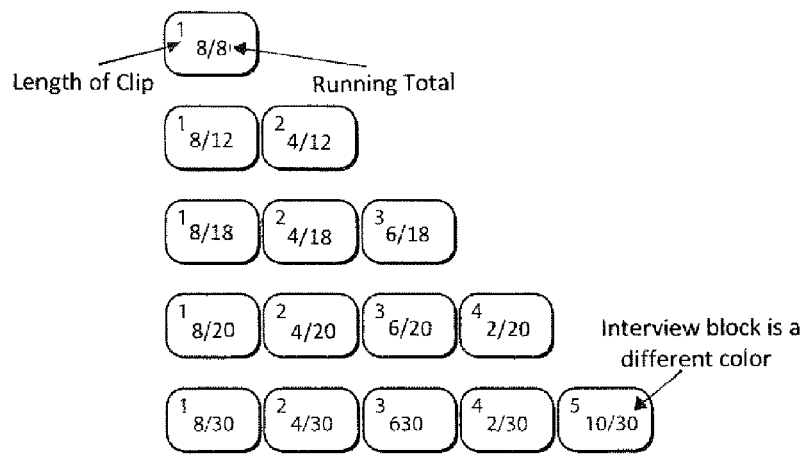

Length of Clip — Running Total

Interview block is a different color

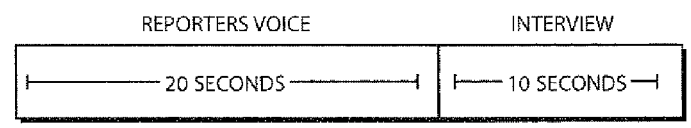

REPORTERS VOICE — INTERVIEW
20 SECONDS — 10 SECONDS

CHANGING THE SEQURNCE OF CLIPS USING BUNGEE BLOCKS

AUDIO IN TIMELINE

Drag one clip over another to change sequence

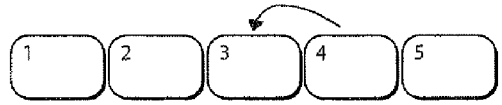

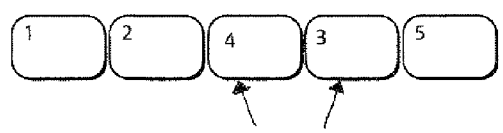

Sequence of video clips is now changed, but number on the blocks reflects the order which they were first created.

FIG.20

DIGITAL MEDIA EDITING INTERFACE USING A SUPERCURSOR FOR SELECTING MEDIA CLIPS FOR EDITING

This application claims priority from U.S. Provisional Patent Application No. 61/203,384 filed Dec. 23, 2008, entitled Audio Editing Interface.

FIELD OF THE INVENTION

This invention relates to graphical user interfaces (GUIs) specifically for the purpose of editing and manipulating sound media, such as digital sound tracks of one or more audio sources, and/or video media, in a small format touch-screen display on both mobile and stationary computing devices.

BACKGROUND OF THE INVENTION

Digital recording and editing of sound and video images has become a mainstream tool for the preparation and production of audio and video publications in a variety of media industries. Editing functions, such as inserting, deleting, moving or copying, are easily accomplished by manipulating digital audio data. A visual representation of an audio waveform may be used in combination with audible playback of the waveform to identify desired audio segments. Conventionally, desired sections of digital audio sound tracks are marked, highlighted, or selected by placing a cursor at the beginning and the end of the section. This cursor, in a desktop or laptop computer system, is controlled by means of a keyboard and/or a mouse. Likewise, in video editing systems, visual representation of the visual media along with the associated audio data, is represented on the screen along a timeline. Desired sections of audio and video are marked, highlighted or selected by placing a cursor at the beginning and the end of the section. This cursor, in a desktop or laptop computer system, is controlled by means of a keyboard and/or a mouse. In both cases, the user creates a 'mark in' along the timeline, and then a 'mark out' along the timeline, in order to identify the section of audio, video, or both mediums, the user wishes to manipulate.

Such systems allow for very sophisticated editing of audio and video data files, but they are generally not intuitive and not easy to use on a mobile platform, and they are best suited to non-mobile computing platforms with significant visual display size. They are not well suited with smaller computing devices, such as a smart phone, personal digital assistant (PDA) or tablet or possibly even a netbook computer.

It is one object of the present invention to provide an intuitive audio and/or video editing system that provides such editing functions, as for example "Insert", "Delete", "Move", "Copy", "Paste", by means of a smart audio cursor suited to touch-screen visual editing in mobile sound editing applications, and also through the creation of anon-timeline based system of editing and mixing, herein alternatively referred to as a method of manipulating or using 'bungee blocks' or 'media blocks'.

It is known that broadcast journalists, podcasters, and other similar professionals, often need to record, edit and send audio recordings from remote locations, and whereas the current equipment is often unsuited for that task, being large, complex, overly expensive, and difficult to carry and use in a field reporting environment, there is a need for a small, portable, inexpensive and easy to use device to fulfill all of these functions.

Applicant is aware of patents regarding such audio recording and editing tools such as:

U.S. Pat. No. 7,167,763 titled "Method and apparatus for providing a graphical user interface for a player/recorder system", issued to Claar et al. on Jan. 23, 2007, describes a player/recorder system with a computer based graphical user interface controlling one or more tracks of several audio channels. The interface includes two input display sections with many control boxes to control one or more tracks of audio input, and one track of audio output to control the resulting multiple track audio recording. The display includes a scroll bar to access additional control boxes than cannot otherwise fit on the display at once. This prior art is complex and requires display real estate, that is display area, that is simply not available on small format computing devices such as small, or pocket-size computers or smart phones or like small-screen processors. In addition this prior art is cumbersome, complex and not intuitive to the user relative to the present invention.

U.S. Pat. Nos. 5,151,998 and 5,204,969 titled "Sound editing system using visually displayed control line for altering specified characteristic of adjacent segment of stored waveform", issued to Capps et al. on Sep. 29, 1992, and Apr. 20, 1993, describes both hardware and software for a personal computer enabling user recording, editing, and playback of sound. The sound editor user interface displays analog representations of digital audio waveforms, enabling a user to mix together several audio waveforms, and to modify the audio characteristics including pitch and amplitude of select parts of each waveform. Although simpler, using a rudimentary audio cursor (line segment), and more intuitive than Claar, U.S. Pat. No. 7,167,763, the Capps prior art is primarily a digital mixing device that consumes more display real estate than available on a small format computing device, and is in applicant's opinion less intuitive than the present invention.

U.S. Pat. No. 4,868,687 titled "Audio editor display interface", issued to Penn, et. al. on Sep. 19, 1989, describes an audio editor comprising circuitry for converting a received audio sound recording into digital data blocks, where each data block represents a corresponding portion of the sound recording during a predetermined time interval. Also included is circuitry for storing the data blocks as a consecutive sequence representing the sound recording. A video display is provided to show the data blocks as a timed based graphical representation to a user. Also provided is a method of displaying the sound recording including the steps of (1) converting the received sound recording into digital data blocks, (2) displaying an axis representing time, (3) displaying a graphical representation of the digital data adjacent to the time axis corresponding to the relative time position of a corresponding sound recording portion in that time period, and (4) displaying at least one user locatable mark on the time axis representing a time point of the sound recording. Editing is performed by character and function key sequences to mark copy and paste audio sequences from source audio blocks to an output recording. Again the display real estate required is significantly more than that found on small format computing displays, the character based editing does not take advantage of a touch-screen interface, and the editor is not in applicant's opinion as intuitive as the present invention due to use of English commands as compared to iconic operations.

SUMMARY OF THE INVENTION

In all of the above prior art patents, the difficulty of using the described device is that it is difficult to arrange long blocks of video or audio, on a small screen. For example, one block of video may be 30 minutes long, while the adjacent block is only two seconds long. Viewed in an ordinary timeline, it can be very difficult to see, let alone manipulate, both of these clips at once. The present invention solves this problem through the use of a multi-purpose 'smart cursor' and a system of small, iconic data blocks (the bungee or media blocks), that snap into the right order automatically. These blocks are icons that represent 'pointers' back to the original source file. The blocks, again, referred to herein as bungee blocks or media blocks, are not represented along a timeline. Rather, all the icons are the same size, whether they represent a 30 minute block of media data, or a two second block of media data. This makes it very easy to see all the blocks on a small screen display such as for example found on a conventional iPhone™ made by Apple™, and to arrange them into the desired order. The blocks are also designed in such a way the user can arrange them easily, simply by dragging one block over the other block, whereupon the two blocks will automatically change places. This program allows the user to, firstly, very quickly create and arrange the bungee blocks, while, secondly, more detailed or sophisticated editing functions can be done on an included 'fine edit screen', which acts more like a traditional multimedia editor set along a timeline.

According to one aspect of the present invention the workflow for the device then, is as follows:

Open a media file; highlight sections (clips) of that media file, and then create a media block (or bungee block). This block will drop into what is called a 'build track'. The user repeats this process until all of the desired clips are selected. The blocks will be lined up on the build track in the order they were created. The user can then simply pull the blocks, for example by merely applying the tip of a finger or stylus onto the corresponding media block icon on the screen and dragging the fingertip along the screen or achieving the same result using a remote cursor-moving device such as a so-called "mouse" or stylus on a remote tablet or touch sensitive and (herein collectively referred to as a "touch-screen"), into the order the user desires and once placed the blocks snap into line on the build track even if only roughly or approximately placed into the correct position so long as the processor software monitoring the icon location can determine the desired location of the block along the build track, for example where it is desired to insert the block between two adjacent blocks. As used herein, 'touch screen' is intended to mean a device in which the user interface is controlled by a touch screen in which the user can press a finger to the screen, and thus control elements of a software application, for example as is common with an iPhone™ or similar device; or also a touch screen in which the user can control the user interface using a stylus pressed to the screen, as is common for example with a Palm Treo™ smart phone, or similar device; or alternatively a device that uses an external control such as a so-called 'mouse'; or alternatively an external touch sensitive pad that is connected to the device.

In the case of audio, if the user wants to review the contents represented by a specific media block, the user can press that block to select it, and press play, and the audio will be played back. In the case of video, if the user wants to review the contents represented by a specific media block, the user can press that block to select it and press play, and the video will play back on the included video player. In either case, once a block is highlighted in this way, it can be deleted from the build track by pressing the delete button. In this way, it is simpler for the user to highlight and manipulate data including either large data clips or small ones.

Once this step of creating and ordering the media blocks is completed, the user can go to the fine edit screen, which displays the result of the combined media blocks, but along a traditional timeline. The video is represented by a conventional time-line video strip, as is seen in various current devices, such as the iMovie™ editor by Apple™ computers. The audio is represented by a conventional time-line waveform, as is seen in most audio editing suites. At this point the user can do conventional editing functions, such as deleting sections of audio or video, and so on.

In a further aspect, the present invention may be characterized as including a software program designed to provide an audio and video processing system with a display to the user that enables the user to easily view the current state of the multimedia data and the performance of the editing commands on the digital media data and be used on a small, portable computing device, such as but not limited to a 'smart phone' such as the apple iPhone™, PDA, and like small viewing screen, touch-screen computing devices. The present invention allows the user to record sound or video on to the smart phone, and store the recording in the device's onboard memory. It allows the user to easily play back the recorded audio. It allows the user to convert the audio recording to a variety of formats, including but not limited to .wav, .aiff, aac, and .mp3, and the video to a variety of formats, including but not limited to mpeg4, flash video. It also allows the user to open the raw media file and easily edit the digital audio and video, so as to create a news item, musical composition, podcast, or any other type of media item.

Most audio and video editors are complex, even for use on a larger computing device, such as a desktop computer or laptop computer. The current invention presents a design that allows the user to edit digital media on a small device, preferably, but not limited to, devices with a touch-screen interface, with a screen size as small as for example two-inches measured on the diagonal, or, usefully, for screen sizes between two to five inches measured on the diagonal, advantageously for example an elongate rectangular screen.

The preferred embodiment of the media editor of the present invention consists of a touch-sensitive editing screen displaying a time line, a graphical depiction of an analog wave form (source track), a super cursor, a build track, and a toolbar array of iconic functions. Depending on the functional mode of the editor the smart cursor and various touch points on the screen behave differently.

One of the differences from the current invention and earlier media editors is the way the screen is divided into a 'source track' and a 'build track'; and also, the way the user can create audio or video block icons that are more easily moved around. As well, the supercursor makes it easier to highlight portions of audio and/or video, which are then copied to the build track simply by dragging them with a finger or a stylus.

In the case of sound editing only, audio files are first opened in the source track. The user can then highlight a portion of audio by dragging the 'supercursor' from left to right, or vice versa. To create a clip, the user can touch the highlighted portion of audio, and it will create a small audio block icon, called a 'bungee block', which is then dragged to the build track.

In the case of video editing, video files are first opened in a video player screen. There is also a video trim bar, as in conventional digital editors, allowing the user to quickly scan through the video. The user can playback and then mark the 'in' and the 'out' of the portion of the video which the user wants to turn into a video clip. By so doing, the user is also identifying both the video and the audio associated with that video. Once identified or highlighted, the user can press a finger or stylus to the video image, and drag the image to the 'build track', where it is transformed into a bungee block. For each clip so identified, a separate block is created, each numbered in the order they are created, and also showing the length of the clip. These blocks, whether of audio or video, can then be dragged easily into the desired order with the user's finger or stylus. When one block is dragged over the other, the two blocks automatically change places with each other.

If there are too many blocks to fit onto the screen, the user can simply flick a finger or the stylus along the build track to 'scroll' the view to left or right, and see the blocks that are not visible, and to arrange them in turn if so desired.

The super cursor is used for several functions, and is the basic tool used in most cases for moving around the interface and selecting audio clips. Once an audio or video clip is selected and dragged to the build track it is represented as a numbered and coloured square a (block) icon where in one embodiment not intended to be limiting, the number indicates the sequence and time, and the colour indicates the source file. The blocks on the build track automatically gravitate to the left of the screen coming to rest adjacent to the previous block or start of track. Reordering of blocks is simple as touching a block and dragging it to the appropriate location in the build track. Each audio block can be manipulated independently including saving. The completed build of all audio blocks when saved may also be rendered with, for example, a ⅓₀th second fade in, cross fade, and fade out to create a smoothly transitioning audio or video product. In the case of video there may be a cross fade, or the clips simply abut each other with no fade.

In summary, the present invention may be characterized in one aspect as a computer-implemented method, wherein, on a portable digital processing device such as for example an Apple™ I phone™ having a touch-screen display, and while displaying a first application interface of a media editing application on the touch-screen display, and wherein the interface includes a source media depiction depicted along a corresponding source media timeline, a viewer screen, and a queue for block icons representing selected clip portions of the source media depiction, the method includes:

a) detecting a selection of a first clip portion of the source media depiction, b) generating a first block icon and initially displaying the first block icon at a first screen position substantially adjacent the timeline, and subsequently, snapping the first block icon across the screen to a starting position of the queue so that during the snapping the first block icon appears to be pulled, hands-free across the screen from substantially the first screen position to the starting position, c) detecting a selection of a second clip portion of the source media depiction, d) generating a second block icon and initially displaying the second block icon at substantially the first screen position and, subsequently, the snapping the second block icon to a second queue position snugly adjacent the first block icon at the starting position, e) detecting, once the first and second block icons are in the queue, a move of the first or second block icon relative to one another substantially along the queue, and if the first or second block icon overlaps the other by greater than or substantially equal to one half of the other block icon, reversing displayed positions in the queue of the first and second block icons.

The method may also include:

f) detecting a first selection touch-screen gesture on a first timeline position of the source media timeline and assigning the first timeline position to an in-cue for the source media, g) detecting a second selection touch-screen gesture on a second timeline position of the source media timeline and assigning the second timeline position to an out-cue for the source media, whereby a corresponding clip portion of the first or second clip portions is selected as the selections of the first clip portion or the second clip portion.

The method of may also include providing on the first and second block icons corresponding first and second clip length indicators of, respectively, the length of the first clip portion represented by the first block icon and the length of the second clip portion represented by the second block icon. The method may also include providing on the first and second block icons an indicator of total clip length of the cumulative total time length of the clips represented by the blocks. The method may also include providing on the first and second block icons corresponding thumbnail images from the first and second clip portions represented by the first and second block icons respectively.

The viewer screen may advantageously be positioned between the source media depiction and the queue. The queue may be a build track. The source media timeline advantageously be adjacent and parallel to the source media depiction. The source media depiction, the source media timeline and the build track may be depicted horizontally across the touch-screen display. The block icons may be uniform in size relative to each other. They are sized so that at least several block icons, are viewable simultaneously on the touch-screen when displayed on the build track.

The method may further include detecting a touch-and-drag gesture applied to a block icon-to-be-moved on the build track, detecting a release location where the touch-and-drag gesture is released, comparing the release location to locations of remaining block icons on the build track and snapping said the block icon-to-be-moved so as to insert it between a closest adjacent pair of the remaining block icons if the block icon-to-be-moved is substantially equi-distant between them, and otherwise snapping the block icon-to-be-moved to a distal end of the build track, distal from the starting position.

The step of generating the block icons for all desired media clips from the source media is repeated until all desired media clips are resting as block icons in the queue. The step of applying the touch and drag gesture to the block icons on the build track and re-arranging the order of the block icons on the build track is repeated as desired so as to edit an edited version of the source media.

A change-screen button may be depicted on the touch-screen display to change the touch-screen display to display a timeline editor. The method then detects a designation touch or touch-screen gesture against one of the block icons on the build track, and a subsequent touch or touch-screen gesture against the change-screen button, whereafter a second application interface is displayed displaying a timeline based media editor for editing a source media clip associated with the one of the block icons so designated. The block icon may then be edited while in the media editor in the second application interface and, when complete, the user may return from the second application interface to the first application interface.

A corresponding portable multi-function device according to another aspect of the present invention, corresponding to the method according the first aspect of the present invention as set out above, may include:

a) a touch-screen display;

b) one or more processors;

c) memory, and one or more programs stored in the memory and configured to be executed by the one or more processors, wherein the one or more programs may include:
- i. instructions for displaying the first application interface of a media editing application on the touch-screen display, wherein the interface includes the source media depiction depicted along the corresponding source media timeline, the viewer screen, and the queue for block icons representing selected clip portions of the source media depiction,
- ii. instructions for detecting a selection of a first clip portion of the source media depiction,
- iii. instructions for generating the first block icon and initially displaying the first block icon at the first screen position substantially adjacent the timeline, and subsequently, snapping the first block icon across the screen to the starting position of the queue so that the first block icon appears to be pulled, hands-free, across the screen from substantially the first screen position to the starting position,
- iv. instructions for detecting a selection of a second clip portion of the source media depiction,
- v. instructions for generating the second block icon and initially displaying the second block icon at substantially the first screen position and, subsequently, snapping the second block icon to the second queue position snugly adjacent the first block icon at the starting position,
- vi. instructions for detecting, once the first and second block icons are in the queue, a move of the first or second block icon relative to one another substantially along the queue, and if the first or second block icon overlaps the other by greater than or substantially equal to one half of the other block icon, reversing displayed positions in the queue of the first and second block icons.

The device may also include, in the programs, instructions for accomplishing the balance of the steps in the method set out above, for example, instructions for detecting a first selection touch-screen gesture on a first timeline position of the source media timeline and assigning the first timeline position to an in-cue for the source media, and instructions for detecting a second selection touch-screen gesture on a second timeline position of the source media timeline and assigning the second timeline position to an out-cue for the source media, whereby the instructions select a corresponding clip portion of the first or second clip portions as the selections of the first clip portion or the second clip portion.

The present invention also includes graphical user interface corresponding to the method set out above, which may be advantageously provided on the touch-screen display of the portable multifunction device. The graphical user interface thus may include a first application interface of a media editing application, wherein the first application interface includes a source media depiction depicted along a corresponding source media timeline, a viewer screen, and a queue for block icons representing selected clip portions of the source media depiction, wherein:

a) in response to detecting a selection of a first clip portion of the source media depiction, a first block icon is generated and initially displayed at a first screen position substantially adjacent the timeline, and, subsequently, wherein the first block icon is snapped across the screen to a starting position of the queue, wherein, during the snapping, the first block icon appears to be pulled, hands-free, across the screen from substantially the first screen position to the starting position, b) in response to detecting a selection of second clip portion of the source media depiction, a second block icon is generated and initially displayed at substantially the first screen position and, subsequently, snapped to a second queue position snugly adjacent the first block icon at the starting position, c) once the first and second block icons are in the queue, in response to detecting a move of the first or second block icon relative to one another substantially along the queue, if the first or second block icon overlaps the other by greater than or substantially equal to one half of the other block icon, then reversing displayed positions in the queue of the first and second block icons.

The interface may also advantageously be adapted to provide the balance of the steps of the method set out above.

BRIEF DESCRIPTION OF THE DRAWINGS

FIG. 20, is a diagrammatic representation of an example of video journalism editing.

DETAILED DESCRIPTION OF EMBODIMENTS OF THE INVENTION

Figure 1:
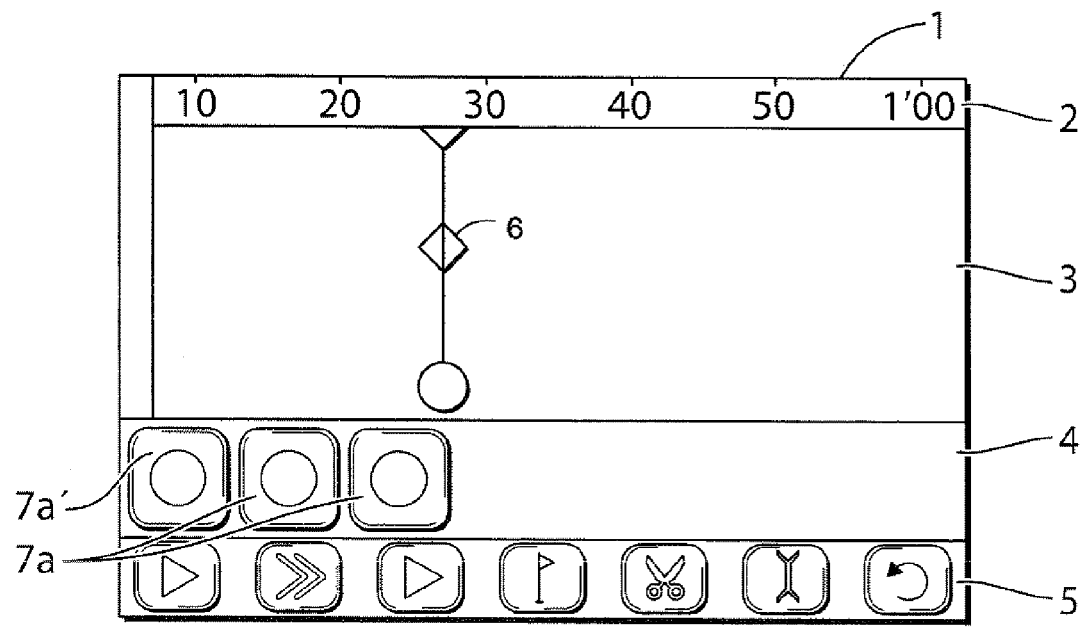
FIG. 1 is a preferred embodiment of the build mode editing screen of the present invention.

The present invention is a media editing tool, and in particular a graphical user interface (GUI) for editing media, for example on a small-screen computing device. The GUI is supported by a software program designed to be used on such small, portable computing devices, such as but not limited to a 'smart phone'. It allows the user to record sound or video on to the smart phone, and store the recording in the smart phone's onboard memory. It allows the user to easily play back the recorded audio and/or video. It allows the user to convert the audio recording to a variety of formats, including but not limited to .wav, .aiff, and .mp3, and also the video to a variety of formats. It also allows the user to open the raw media file and easily edit the digital media, so as to create a news item, musical composition, podcast, or any other type of media file, and then to send that file in such a way as to be displayed automatically on a web site, podcast site, media site such as YouTube™ or other media sites, or into a newsroom for immediate playback on television, radio, or other media.

The present invention presents a unique GUI that allows the user to edit digital media on a small screen device, preferably (but not limited to) devices with a touch-screen interface, for example with a screen size as small as two-inches or between two to five inches (on the diagonal).

The present invention may enable the user to make high-quality raw media recordings of short or long length and then to edit and/or combine these recordings into various types of media production files and then save each production file in one of several commonly supported formats. The present invention also provides the user with the ability to easily export the audio production files to their personal computers (Windows or Mac), or to send media files directly to third parties, via email, ftp or similar transmission method, from the portable computing device, such as but not limited to an iPhone™.

In the case of sound editing, the editor according to the present invention the user opens a build mode edit screen 1 which enables the user to review and extract multiple media clips from one or more recording files or source tracks 3 depicted along a time-line 2 into a single track non-linear editing project using bungee blocks 7a representing the clips, arranged on build track 4. The user may rearrange and edit the blocks 7a as desired, and then to render the build track 4 into a new audio output file. The user can chose the desired audio format (such as aiff, wave, mp3) from a list prior to rendering the output file.

Bungee blocks are defined as a range of audio or video within a specified source file. Each block maintains variables which include a minimum of a source file, offset within the source file and length. These blocks are used to provide the user with the ability to take the useful parts from one or more source files and put them into an organizable location.

A bungee block inherently has a fixed visible size so that the user can easily distinguish each unit. This fixed size can be arbitrarily determined but should remain the same for all items in a bungee block container. For organizational and aesthetic reasons there should also be an arbitrary amount of space or gap between blocks so that by default they aren't touching or overlapping.

To generate a new bungee block, the user must highlight a selection from the source file that determines the offset and length of the bungee block. Once they have done this they can drag from the selection (which creates a block under the cursor/finger) and drop it into the bungee block container. A new bungee block will be created at the end of a queue or at the start of the queue if there are no existing bungee blocks. The newly created bungee block may have a title indicating the number of bungee blocks that have been created in this container (regardless of block deletions). For example, the fifth bungee block dropped into the queue may have the title of "5" even if there are not five blocks in the queue. Each bungee block may also indicate the length of that block under the title.

The bungee block queue shows bungee blocks horizontally, indicating their order with time. Once a bungee block is in the bungee block queue it can be easily deleted by selecting the block and pressing a delete button. If there are more than one bungee blocks in the queue then the user can also re-order the bungee blocks easily by dragging the blocks left or right. When dragging a bungee block in the queue it will only move horizontally. The other bungee blocks will also shift their position while the selected block is being moved. This allows the user to easily see what the new bungee block order will be before the user releases the dragging of the block.

If the number of bungee blocks in the queue exceeds the visible width of the viewer screen then the queue becomes scrollable. The user can scroll the entire queue left or right to view any blocks that are not currently visible. While re-ordering blocks the user can also scroll the entire queue if the user attempts to drag the re-ordered block off-screen.

Figure 5A:
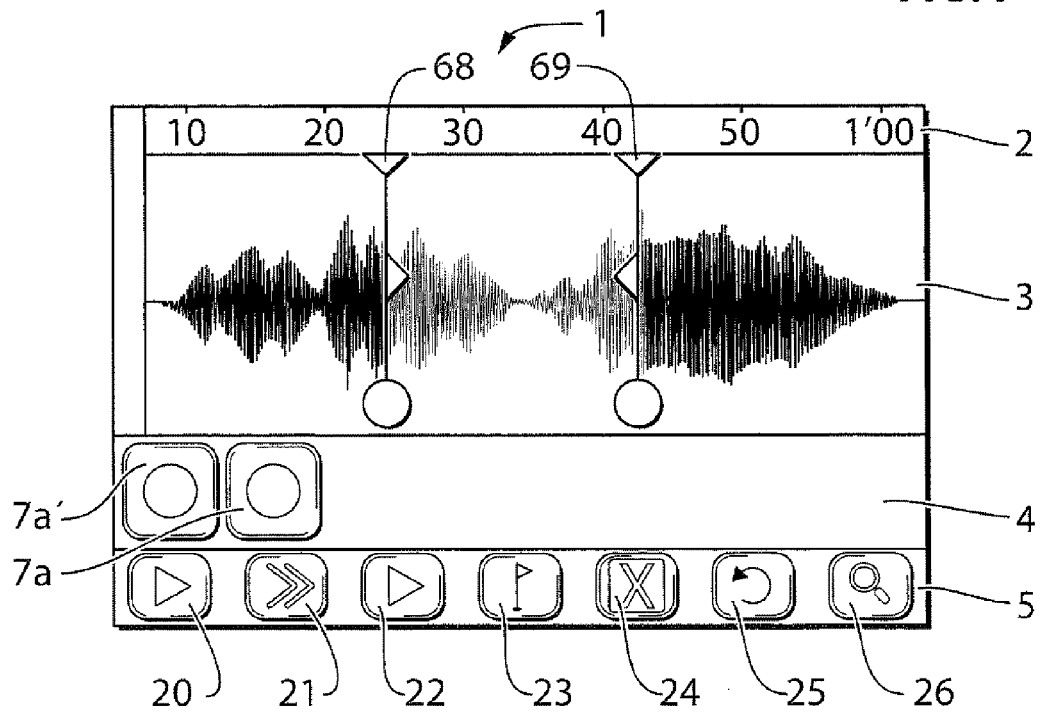
FIGS. 5a and 5b are embodiments of the build mode toolbars of the present invention.
Figure 13:
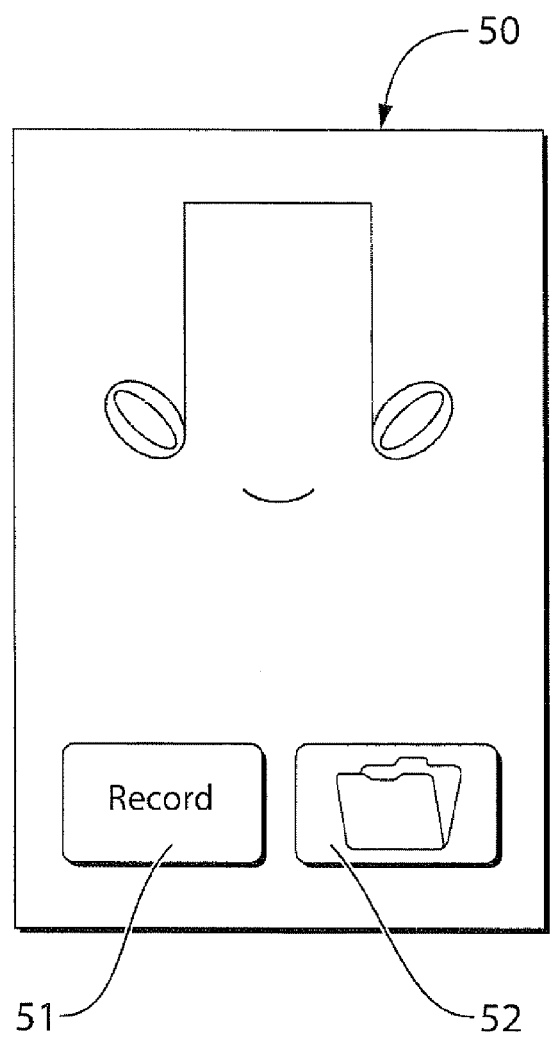
FIG. 13 is an embodiment of the home screen of the present invention.
Figure 14:
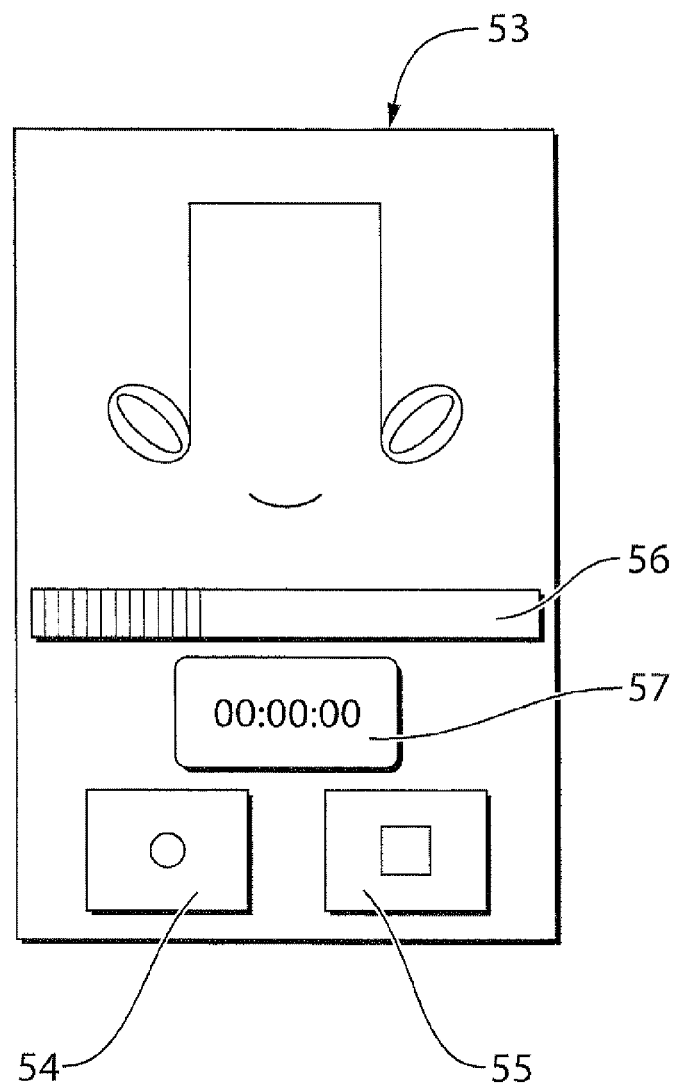
FIG. 14 is an embodiment of the recording screen of the present invention.
Figure 15:
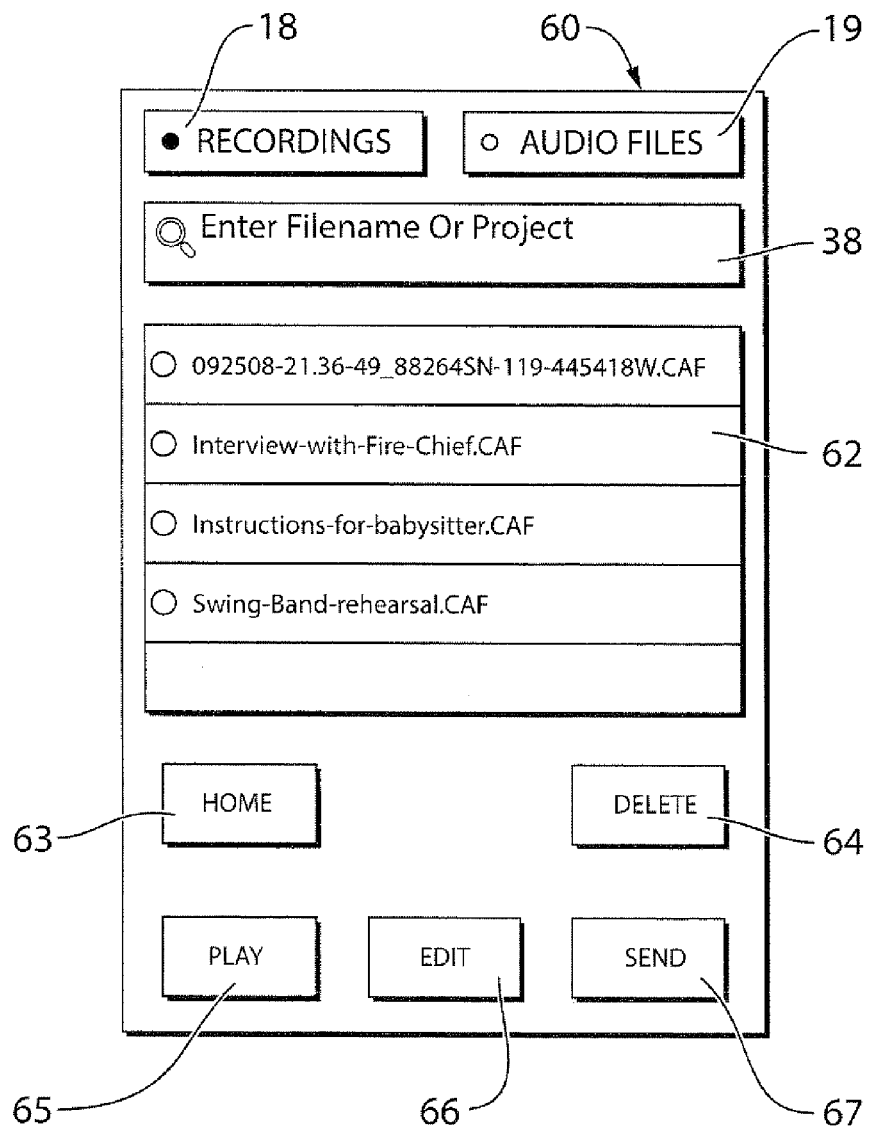
FIG. 15 is an embodiment of the file manager screen of the present invention.
Figure 16:
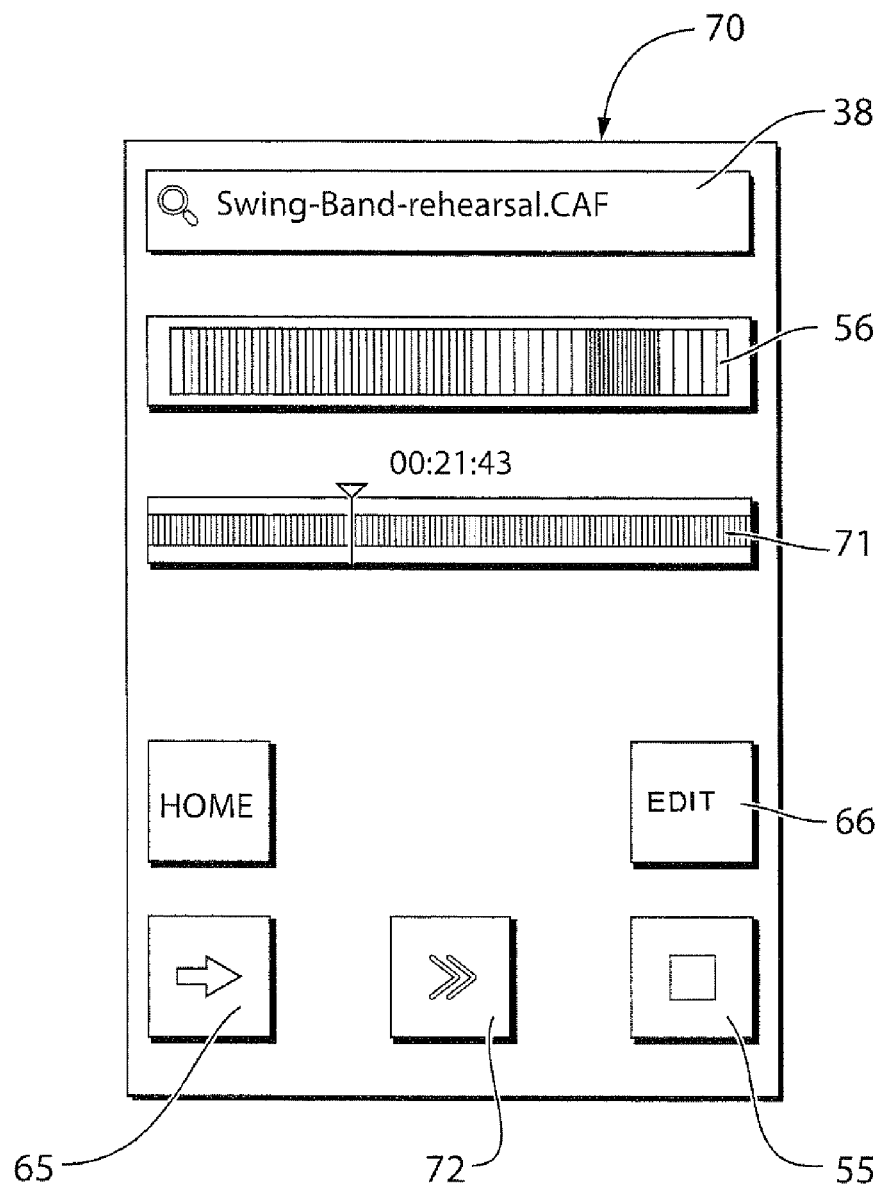
FIG. 16 is an embodiment of the play audio screen of the present invention.
Figure 17:
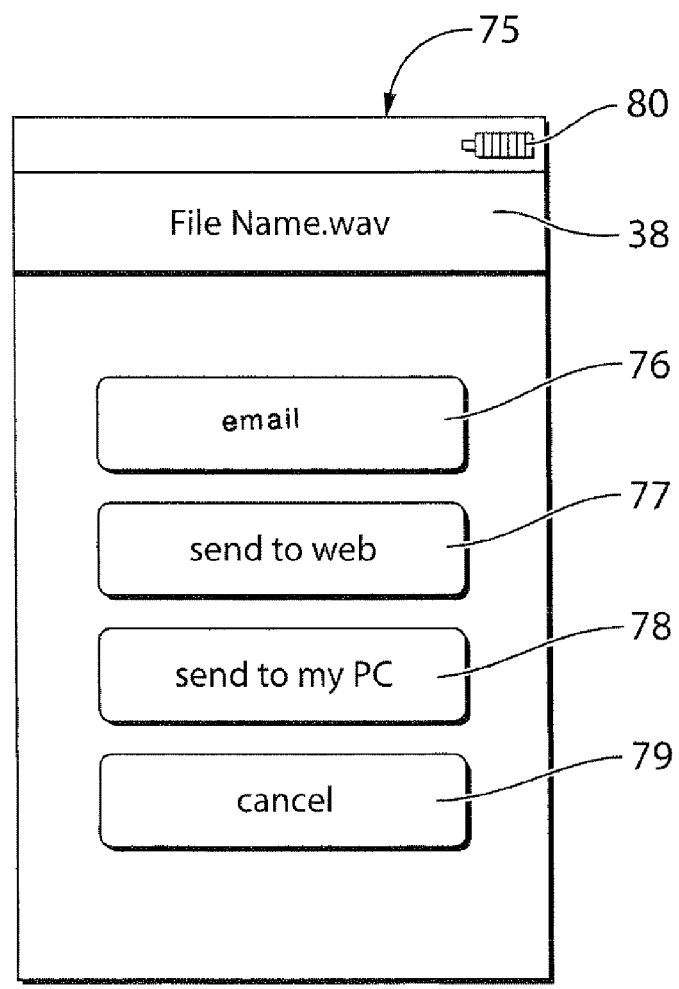
FIG. 17 is an embodiment of the send audio screen of the present invention.

To edit a file, the user first presses the file management button 52 on the home screen 50 as shown in FIG. 13. The file management screen 60 will appear as shown in FIG. 15. From here a file may be selected. The user then presses the "Edit" button 66. The editing screen as shown in FIG. 5a will appear in build mode 1, with the selected media file in the top track. All of the editing functions are performed by means of the toolbar 5 commands and the supercursor 6.

Figure 3:
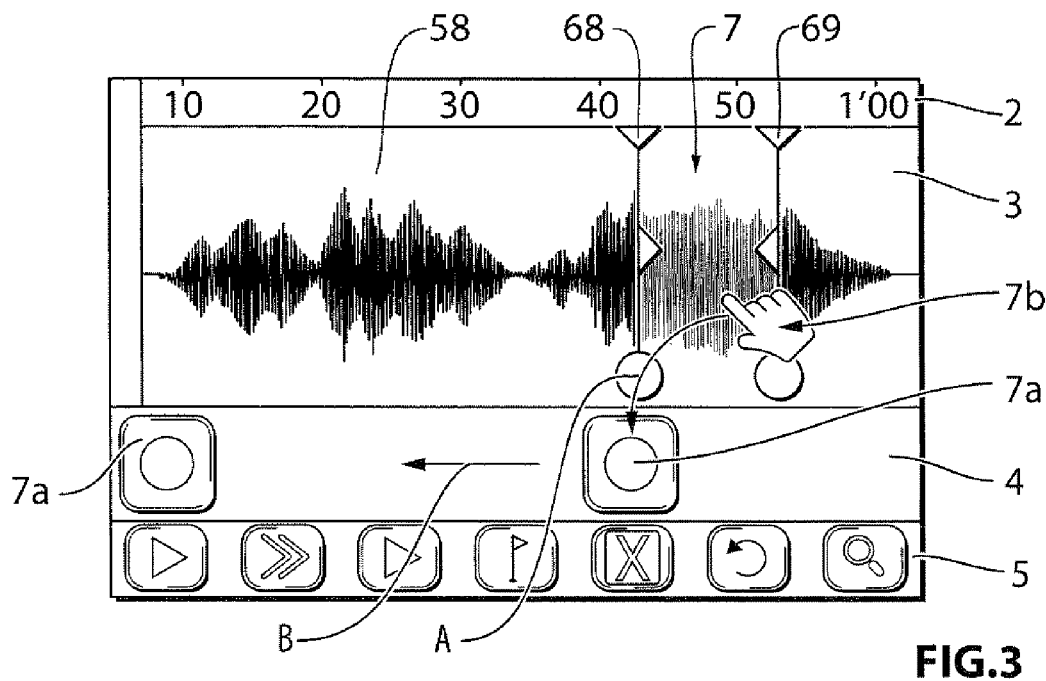
FIGS. 3 and 3a are embodiments of audio clip selection and build track assembly.

As shown in FIG. 3, only one source file at a time can be opened in the source track 3. Source media clips 7 can be highlighted and selected in the source track 3, and moved by dragging in direction A into build track 4. When clips 7 are copied into the build track 4, they first are converted into representative bungee blocks 7a adjacent the source track as the clip 7 is highlighted (by touching) and dragged off the source track in direction A. The clips thus appear as square icon media or bungee blocks 7a. Once blocks 7a are generated and the touch released (or the blocks otherwise let go) and allowed to move hands-free, the blocks then move across the screen to the first or next available position in queue in the build track, for example moving in direction B. The selected clips represented as blocks 7a can then be re-arranged by user 7b and edited as better described below prior to rendering the project into a new audio file. All of the selections of clips 7 and editing are non-destructive to the source files.

The clips 7 when placed in the build track 4 as corresponding blocks 7a are actually symbolic elements or icons that contain pointers to the selected regions of their respective source files and other meta-data used for rendering purposes. The first clip 7 pulled down from the source track 3 creates corresponding icon with the number '1'. The length of the clip (for example in "minute:seconds" format e.g. "000:16") and the overall length of the media file in the build track may be displayed within the icon. The second clip 7 pulled down is identified by the number 2, and the corresponding length of the clip and the total media file length displayed, and so on. The blocks 7a may be relatively small, for example ⅜ inch across as viewed on a small screen, and are uniformly dimensioned in a preferred embodiment, which is not intended to be limiting.

Clips 7 are identified as to which source file they came from by for example the following color sequence: Clips 7 from first source file are blue. Clips from the second source files are green. Clips from the third source file are yellow. Clips from the fourth source file are red, and so on for the number of source files. The system may repeat the color scheme if more source files are used than the system has colors.

Figure 2:
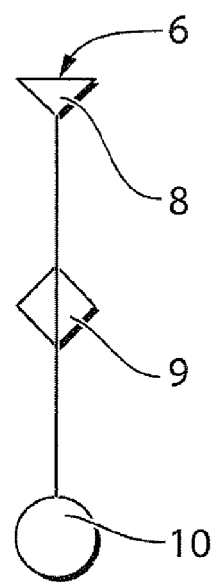
FIG. 2 is a preferred embodiment of the supercursor of the present invention.
Figure 3A:
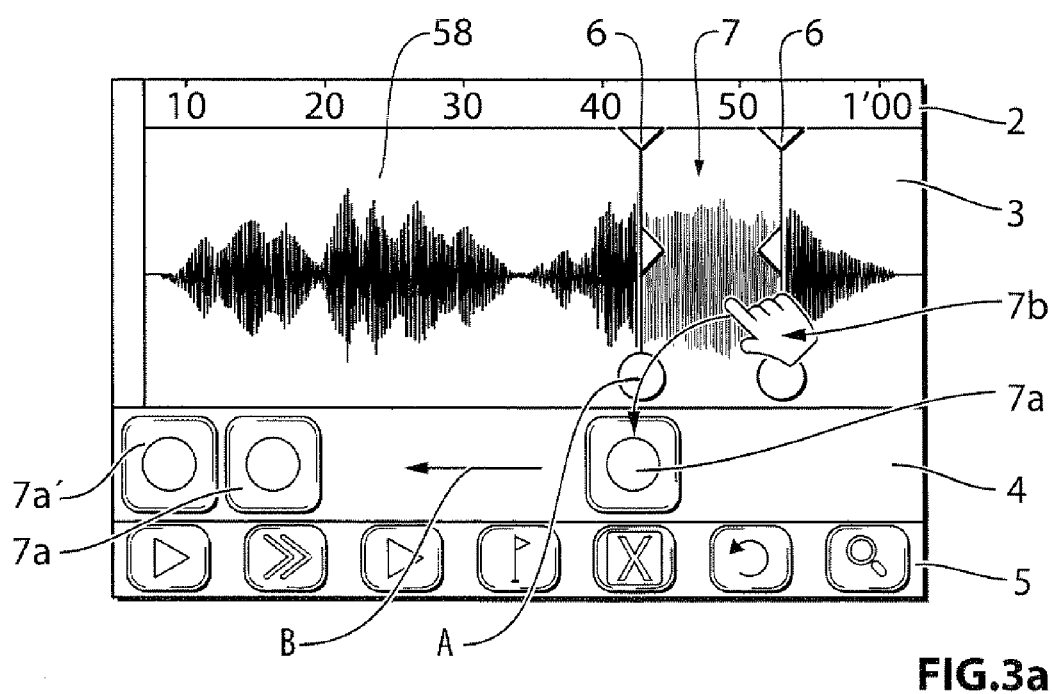
Figure 4:
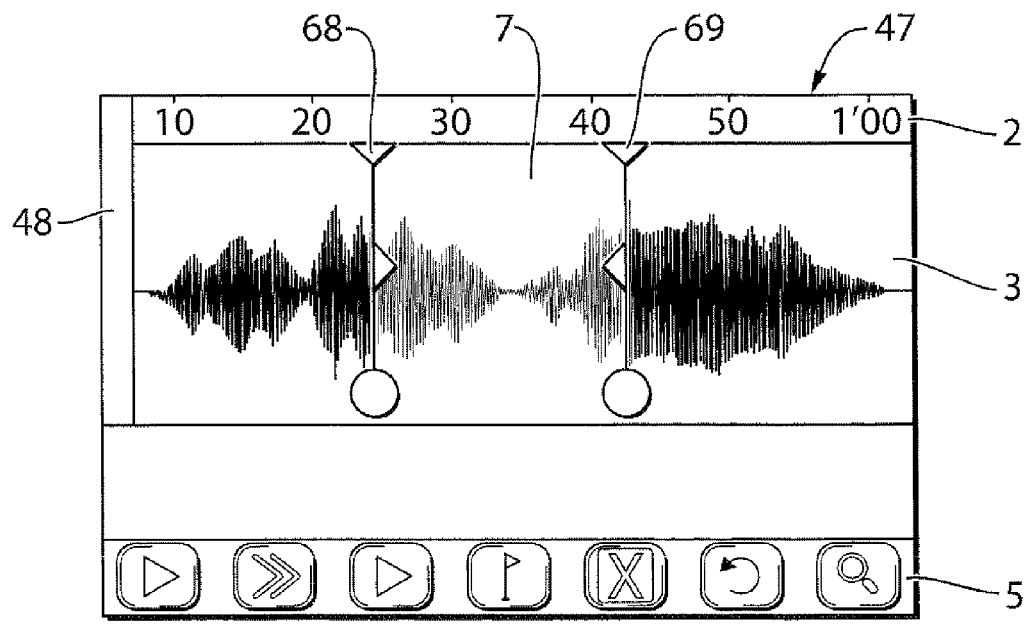
FIG. 4 is an embodiment of the edit screen in fine edit mode.

As shown in FIGS. 2, 3, and 3a, the supercursor 6 is used for several functions, and is the basic tool used in most cases for moving around the interface, and selecting clips 7. At the top of the supercursor 6 is a pull tab 8. The user can move the cursor 6 along the timeline 2 by pulling this tab to the right or left. When the cursor reaches either edge of the screen, it will stay in 5 place, and the timeline 2 and the waveforms 58 will begin scrolling at a speed first of for example two times normal playing speed for four seconds, and then four times playing speed. When the cursor 6 is pulled back in the opposite direction, scrolling ceases. Further down the cursor, there is a tab 9. These tabs are used to mark the "in" and "out" points, and to highlight portions 59 of the waveform 58 as shown in FIGS. 3, 3*a*, and 4.

The simplest way to highlight a section of media from the source track is to touch a finger to the diamond tabs 9 and pull to the right or left. Two cursors 68 and 69 will appear, and the portion 59 of media between them will be highlighted, indicating that the region between the two cursors is selected.

At the bottom of the supercursor 6 is a tab 10, known as the scrub tool 10. When the scrub tool 10 is pulled to the left or right it will play the media, at a slower rate than normal, for example, 75 per cent, that is three-quarters of normal speed. When the scrub tool 10 is pulled off screen to either left or right, it begins playing faster, at for example about 1.5 times to 1.7 times normal speed, for five seconds, and then plays at two times normal speed. It effectively works as fast forward or reverse. When the scrub tool 10 is pulled back, it stops, and/or plays in the opposite direction.

FIG. 3*a* shows the bungee feature of this editing GUI, which allows the user to automatically combine clips, ready to be saved and rendered. When a clip 7 is dragged in direction A from the source track 3 into the build track 4, it is transformed into a simple square icon or bungee block 7*a* representing the corresponding clip 7. As stated above, the colour of the icon is set based on which media source file it is pulled from. The icons may be numbered sequentially (not shown), in the order in which they are dragged to the build track 4.

As each clip is pulled down to the build track 4, it automatically is 'pulled' in direction B seemingly elastically and hands-free to the left side, or starting position, of the build track 4 as shown in FIG. 3. Thus a first clip 7 when dragged down to build track 4, is represented by a corresponding first bungee block 7*a* and pulled to the far left of build track 4. When a second clip is dragged down, its corresponding bungee block 7*a*' is automatically pulled to the left, until it rests against the first block 7*a*'. The block corresponding to each successive clip 7 will automatically come to rest closely adjacent against the last block added to the line of blocks 7*a*. The bungee feature of the GUI also allows the user to quickly change the order of the clips that is, the order of the blocks 7*a* lined up along build track 4. To do this, the user, touches and drags one block 7*a* toward or over another. When the block 7*a* being dragged goes more than halfway across the other block, the two blocks simply swap places. If the user highlights one block by touching it, then that block, that is the clip corresponding to the block icon, can be saved with 'save selection 29'.

Otherwise, all clips 7 represented by block 7*a* in build track 4 can be saved and rendered into a completed media file by pressing the 'save' button 28. When the program supporting the GUI renders, it inserts a cross fade of 1/30th of a second between each clip, a 1/30th of a second fade in at the start, and a 1/30th of a second fade-out at the end.

The user can highlight a clip by touching an individual bungee block 7*a*. Once highlighted, the user can use save selection 29 to save only that block 7*a*. Once a clip is selected, pressing play 20 will result in the playback starting at the beginning of that block 7*a*, and playing through the rest of the file. This eliminates the need for tab left or tab right buttons on the toolbar 5. To play the entire file from the beginning, the user presses the return to start button 27, then presses the play button 20.

The blocks 7*a* used in the GUI according to present invention are graphical representations of the real audio file 58. They use pointers back to the original file 58. When the project is saved, all of the clips 7 will be saved in the order their corresponding blocks 7*a* are represented on the screen, with a short cross-fade of approximately $1/30^{th}$ of a second between each clip, in order to smooth out transitions.

Figure 6A:
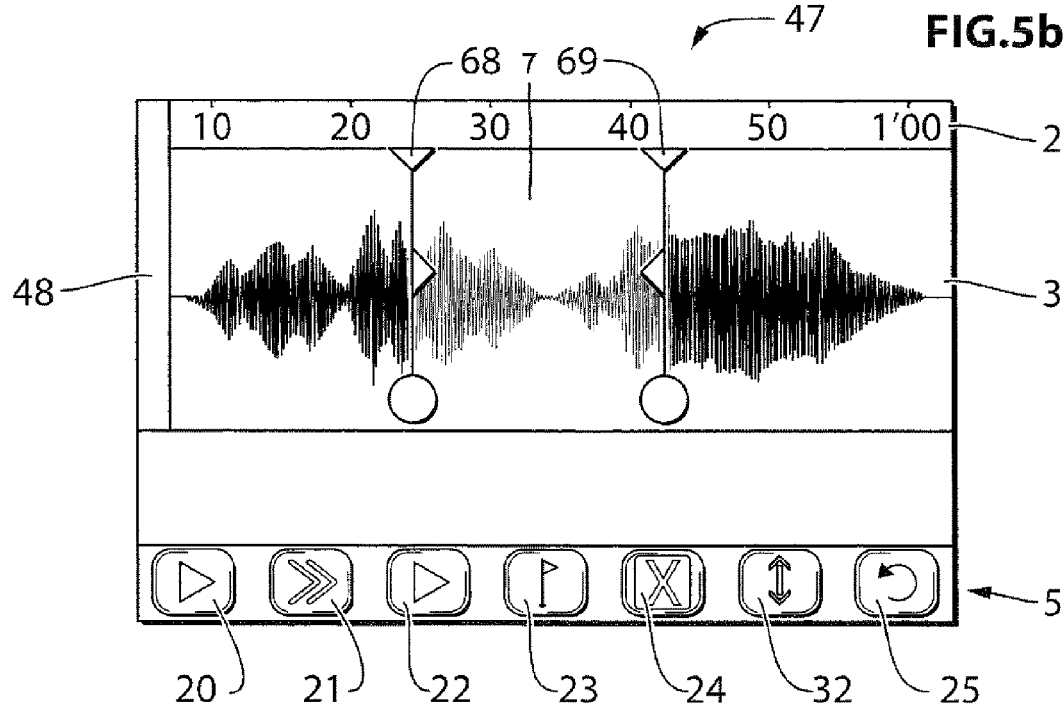
FIGS. 6a, 6b, and 6c are embodiments of the fine edit mode toolbars of the present invention.
Figure 6B:
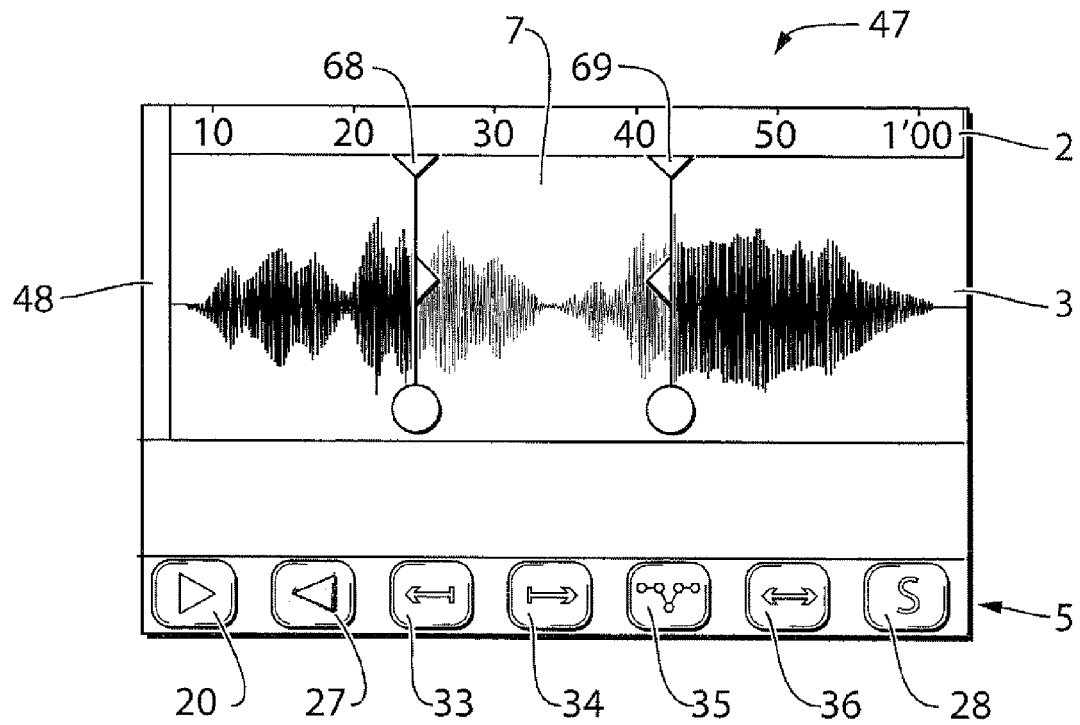
Figure 6C:
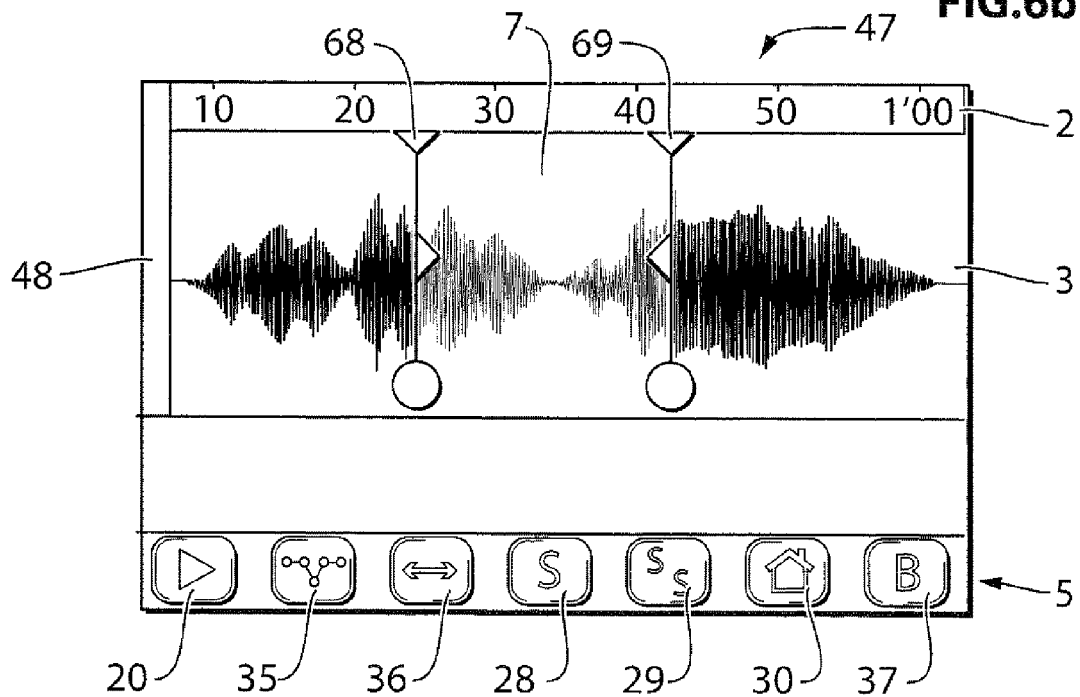
Figure 7:
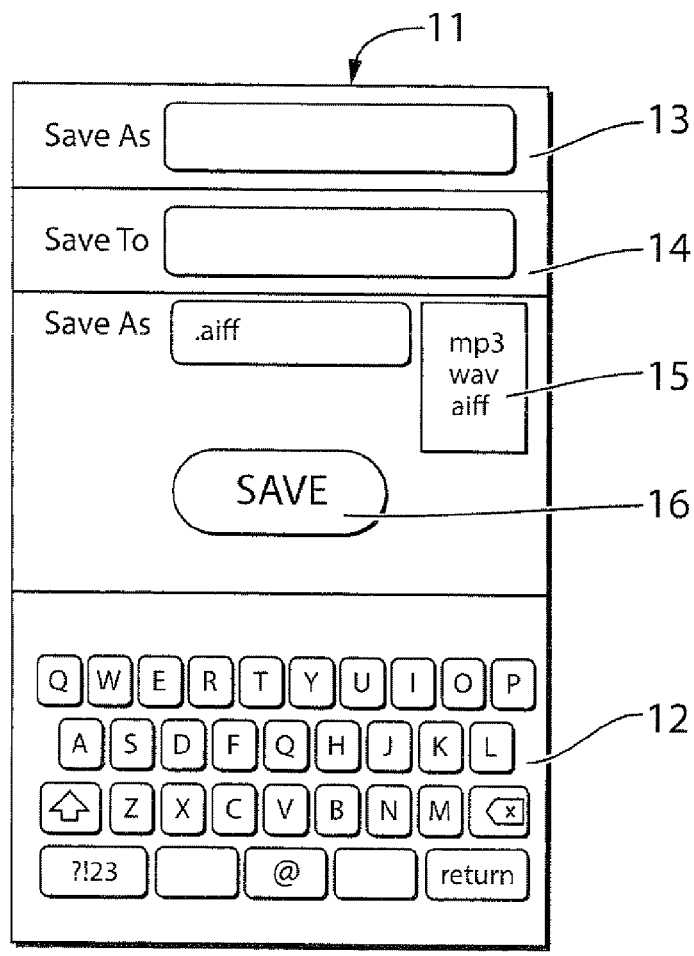
FIG. 7 is an embodiment of the file save interface of the present invention.
Figure 8:
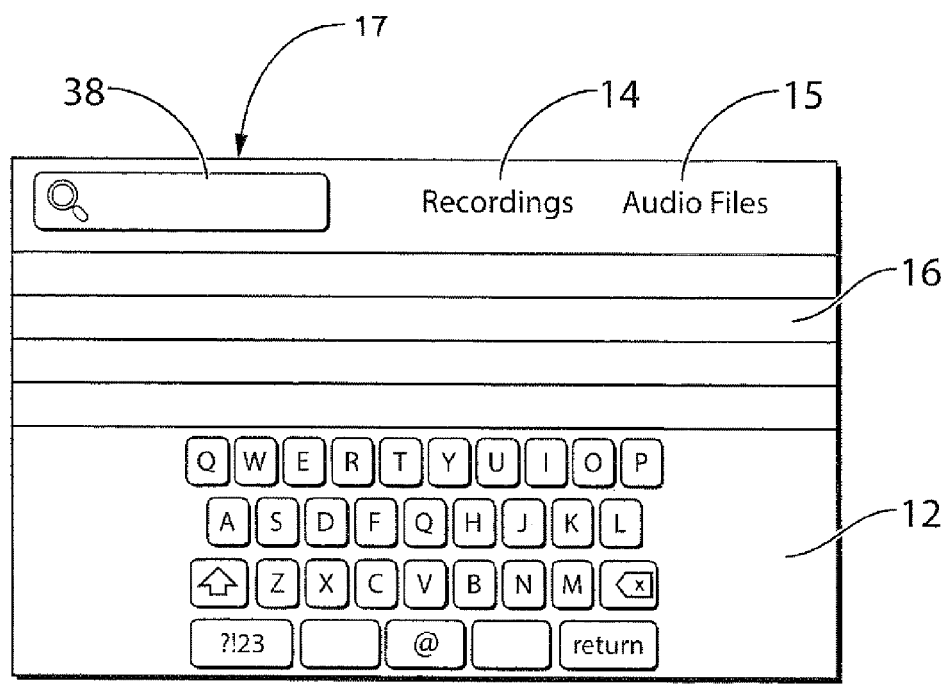
FIG. 8 is an embodiment of the spotlight (file open/search) window of the present invention.

The user can quickly select and arrange a series of clips 7 in the build mode 1, but to make finer adjustments to the media project, the user must go into fine editing mode 47 as shown in FIGS. 6*a*, 6*b*, and 6*c*. To do this, the user may press the fine edit button 31 in the toolbar 5. The fine edit screen 47 appears, with only one track, filled by the waveform as shown in FIGS. 4, 6*a*, 6*b*, and 6*c*.

The fine edit screen 47 has a volume meter 48 on the left side; a timeline 2 at the top, a supercursor 6, and a scrolling toolbar 5. Toolbar 5 commands for the fine edit mode may include: play 20; fast forward 21; play around the cursor 22; mark mode 23; delete 24; split 31; open/search 26; save selection 29; volume curve 35; fit clip to screen 36; return to start 27; tab left 33; tab right 34; home 30; go to build mode 37. Only seven commands are visible at any given time. "play" button 20 always remains in place. The other six visible tools scroll to left or right to make room for the other unseen commands. Scrolling action may be "ratcheted", such that the toolbar 5 stops at pre-defined positions. The tool bar 5 along the bottom of the window contains symbols for all of the operational commands for the editing mode. The 'play' button 20 is static and does not move. The view of all other tools is to be scrollable in sections of six command symbols.

Figure 5B:
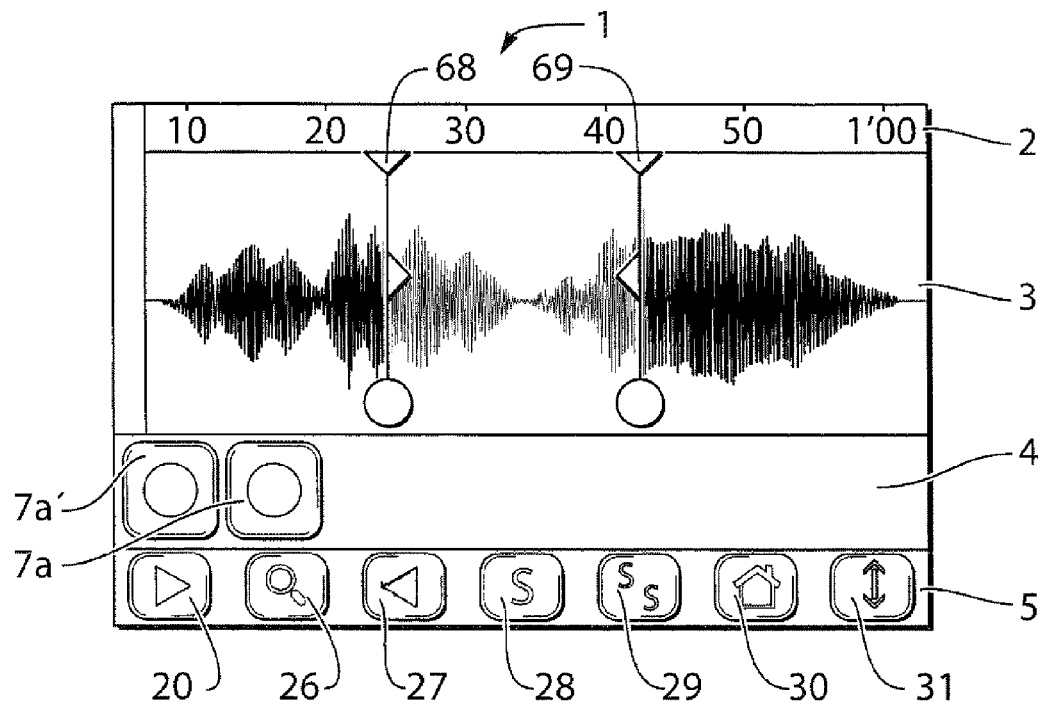

There are different toolbars 5 for build mode 1 shown in FIGS. 5*a* and 5*b* that differ from those of the fine edit mode. Build mode 1 includes the following tools: play 20, fast forward 21, play around the cursor 22, mark mode 23, delete 24, undo 25, save 28, save selection 29, home 30, and open/search 26.

The user can scroll the toolbars 5 by dragging them to the left or right. The toolbars 5 will scroll in the direction of drag, with a ratcheting motion, displaying the next set of tool buttons.

Figure 9:
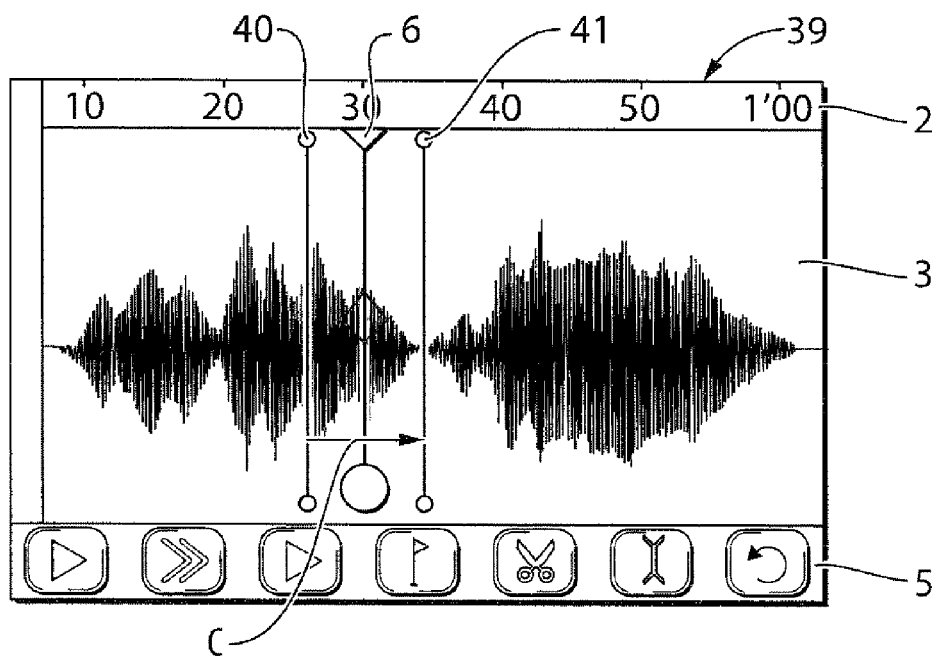
FIG. 9 is an embodiment of the play-around mode of the build editor.
Figure 10:
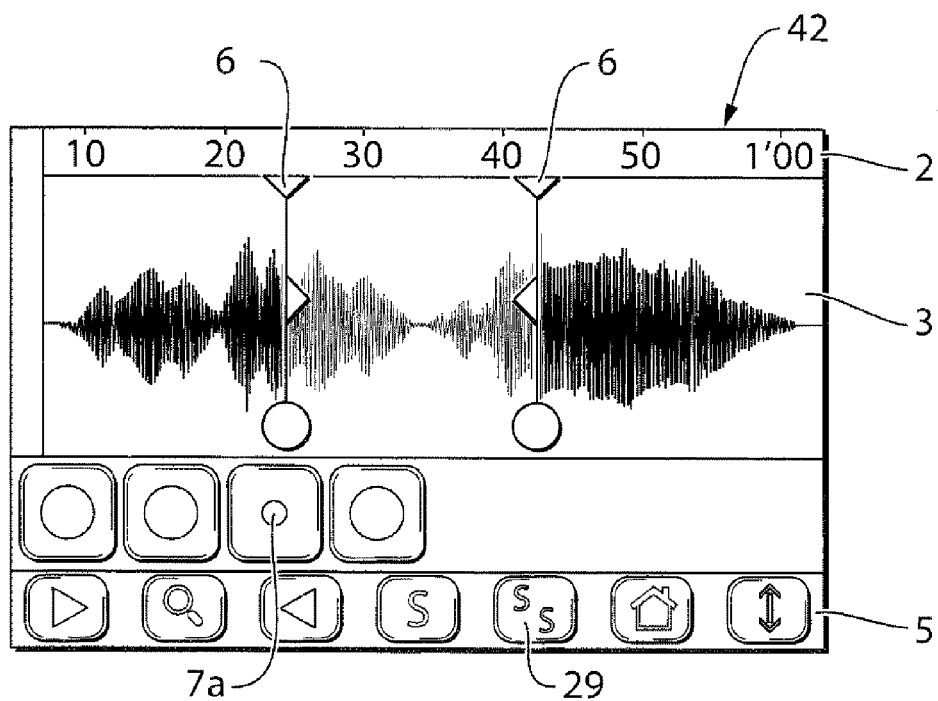
FIG. 10 is an embodiment of the build mode save selection feature.
Figure 11:
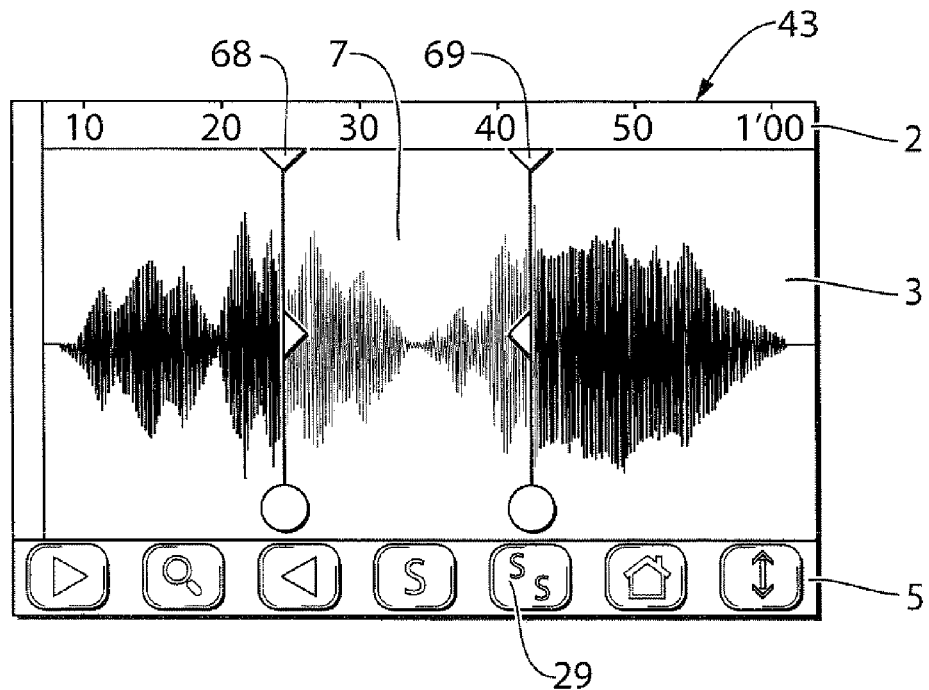
FIG. 11 is an embodiment of the fine edit mode save selection feature.

The play around the cursor function is designed to make it easier to find the exact spot to place a Mark In or Mark Out. When the play around cursor button 22 is pressed, a second 'Ghost Playhead' appears, and plays the media, for example the audio or video for three seconds on either side of the cursor as shown in FIG. 9. If the cursor is at the beginning, it only plays the media for three seconds after the cursor. The user can use zoom to see the edit point more clearly.

When play around cursor command is used while in mark mode 23, the audio will play for three seconds before and after the 'mark out' point. This is because the mark in point has already been chosen. This will allow the user to visually determine the exact location the supercursor 6 needs to be moved to in the media timeline 2 for subsequent operations.

The marking tool 23 is used to highlight media when the media to be selected is too large to be seen in the window. When the mark button is pressed, the system goes into a different mode of operation in which the only commands that work are moving and zooming commands. In this mode the 'mark in' cursor will not move or disappear until the mark button is pressed again, see FIG. 9.

The following is an example of the operation of the GUI according to one aspect of the present invention:

Firstly, the user moves the cursor to the beginning of a clip 7. The user presses the Mark button 23. The mark-in 40 will be at the cursor's current position.

Secondly, the user moves the second cursor to the mark-out position by pulling on the diamond tab 9, and scrolling to the out-point, or flicking along the timeline bar, or playing the media, until the desired point is reached, and then touching the top of the track with a finger, whereupon the marking cursor will snap to that point. Finally, the user may use the scrub tool 10 to listen/watch to the audio/video. In this mode, the scrub tool 10 highlights the media as it progresses along the timeline. This is often the easiest way to find the mark-out point.

The user may use the play around the cursor button 22 to help choose the exact point for the out cue. When pressed, button 22 will play three seconds before and three seconds after the mark-out point. Zoom in or out is done with a conventional stroking gesture, for example by horizontally "pinching" the screen with a fingertip (if for example the device is an iPhone™). The scrub feature may also be used to find the exact point. When the clip is highlighted, the user can delete the audio clip in fine edit mode 47, or pull it from the source track 3 into the build track 4 when in build model.

The split function 32 is only used in fine edit mode 47. When the split 32 tool is pressed it will separate one clip into two separate clips 7 and their corresponding blocks 7a. When the user switches back to build mode 1, the single block 7a from before the split will be replaced by two separate bungee blocks 7a. The name on the blocks 7a will change. For example, instead of "1", the blocks 7a will now be called "1.1" and "1.2" the time coding on the blocks 7a will also represent the changes made by the split 32 command. These two blocks 7a may now be moved independently of each other. To delete one section in the middle of a clip, the user splits on both sides of the area to be affected. The newly isolated clip may then be deleted. To move a section of a larger clip, the user uses the split button 32 on both sides of the long clip to delete the ends and leave the center portion of desired length. The user then returns to build mode 1. The user then pulls the new, shorter clip to the desired position within build mode 1.

Pressing the undo button 25 reverses the last action. Pressing repeatably removes the last number of actions up to a maximum of five undos. Undo works in all modes, that is it will undo the last placement of an anchor point 45 in volume curve mode 22, or remove a 'split' made by the split command 32. Undo does not affect zooming.

Figure 12:
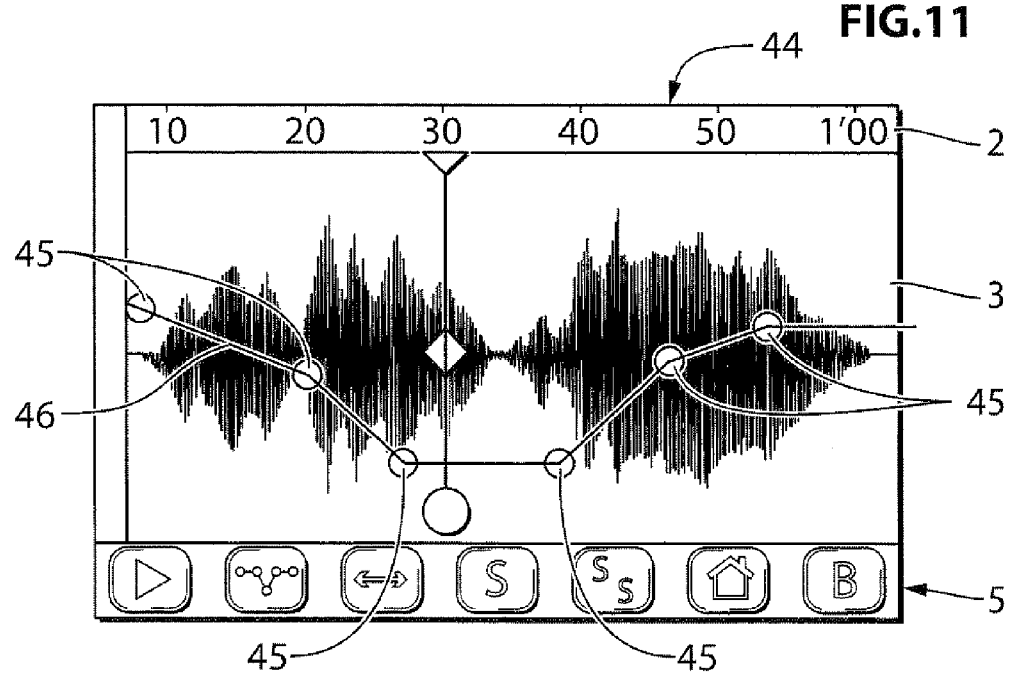
FIG. 12 is an embodiment of the fine edit mode volume curve feature.

In build mode 1, the save button 28 is used to render and save whatever is on the build track 4. It does not affect the source track 3. Pressing this button opens the save screen. Save as usual, pressing the save button will render the file in the order it is presented on the build track 4. In fine edit mode 47, pressing save 28 has the same effect, saving and rendering whatever is on the fine edit screen 47, including all changes made through volume curve 46 as shown in FIG. 12.

Users can give the file a name, and also a project name, so the user can group several files under a single project heading. As well, the user can choose to Save the file as for example an mp3, way or aiff file or other selection of appropriate formats for the media being edited.

The save selection button 29 is similar to save. In build mode 1, it will only save the selected portion of a media clip that is highlighted by touching a bungee block 7a in the build track 4.
In use, the user:
Highlights area in the build track 4 by touching the block 7.
Presses save selection 29.
Saves the file when the Save screen appears.
Returns to the edit screen.

In fine edit mode, the user must select a portion of the media file with the supercursor 6, and then use save selection 29, as above. This allows the user to save a selection that spans several clips 7 or blocks 7a.

The view find editing screen button 31 looks like a vertical double arrow, the activation of which switches the program to the fine editing screen.

Depending on the purpose of the build project, it may sometimes be desirable to insert a period of silence between two media clips 7, that is between two adjacent blocks 7a in the build track 4, or at the beginning of the track. Silence may only be inserted before or between existing clips. To insert silence, the user goes to Fine Editing Screen 47. The user uses tab left 33 or tab right 34 to go to the intersection between blocks 7a. The user presses Insert Silence button 49. This will insert a two second block of silence. The view changes to show the Silence block 7 in the centre of the screen. The length of the Silence block may now be changed by 'dragging' the right end of the block. All blocks to the right will move in sequence. The size of the silence block is determined by how far the user drags the right end of the block to the right or left.

Insert silence may also be used to help restore some of the media information in an existing clip. To do this, the user inserts a block of silence, then touches and drags the end of the adjoining block, and drags it into the silence block. This will restore media that was earlier deleted, by telling the program via the GUI to change the 'pointers' for that clip.

The volume curve 46 shown in FIG. 12 is used to raise or lower the sound or gain level through the entire waveform 58, fading or ducking as required. In all views of the fine editing mode 47 there is a thin white line going through the waveform window from left to right, exactly at the centre of the waveform window. This line represents 100 per cent of the volume represented in the waveform.

Pressing the volume curve button 35 puts the system into a different operating mode in which the panning, zooming, undo functions and setting or moving volume curve 46 and anchors 45 work. To enter Volume Curve mode, the user presses the volume curve 35 button. A red line 46 appears at the centre of the fine edit window, overlapping the pale white centre line. At the left hand side, a red circle appears. This is the first anchor point 45. To create a fade in, the user presses a finger to this point, and drags it down. This will cause the red line to be pulled to the bottom, and gradually rise through the rest of the waveform. The user creates a second anchor 45 point by pressing anywhere on the red line 46. Another red circle 45 appears which may be pulled up or down or to the right or left. The line acts like a rubber band, stretched between a series of pins. To erase an anchor point 45, the user presses undo button 25.

The gain change works on a percentage, so pulling the anchor 45 to the bottom of the track eliminates all the sound. Pulling the anchor 45 halfway down reduces gain by 50 per cent. In the same way, pulling the volume curve 46 up increases the volume, so that pulling it up by 50 percent represents volume 50 per cent louder than the original audio.

The fit clip to window button 36 looks like a double-ended horizontal arrow pressing this button allows the user to zoom in and edit a waveform of a selected clip in the fine edit mode 47 of the project. The user can still zoom further in or out as necessary. If the user wants to edit the waveform of one of the clips, then the user first selects the corresponding block 7a by tapping once on it, and then pressing the "Fit Clip to View"

command. The build track 4 view will change to fine edit mode 47 and will display the complete waveform of the selected clip 7.

The timeline of the selected clip will fill 90% of width of the fine edit track. The 'marks' or start and stop selection cursors 6 will be displayed at the left and right of the displayed waveform. The user will be able to extend the duration of the timeline by dragging the selection cursors 6 to the left or right as appropriate. When the start selection cursor 6 is dragged to the left, the displayed wave form will scroll to the right to show that the start point has been moved earlier in time. Similarly, when the end selection cursor 6 is dragged to the right, the waveform will scroll to the left to indicate that the end point has been moved later in time. The user can also do any other editing functions, using the fit clip to window button 36 simply as a quick way to zoom to a specific view.

The home button 30 on the toolbar 5 switches the program back to the Home screen 50 shown in FIG. 13, where the user may choose to record using Record button 51, or may select the file management button (Edit, Play or Send a media file). This is the same as ending a session, and should only be used after the file has been saved. Once pressed, a warning screen pops up with the following warning: "Going Home will cause you to lose all changes. Do you want to continue? "Yes" or "No" pressing No returns to the edit screen. Pressing Yes goes to the home screen 50. This will end the session, and delete all temporary files associated with the build track 4.

The tab buttons 33 and 34 look like arrows with vertical lines at the end. They are available only in fine edit mode 47. When the tab left 33 button is pressed, it will cause the cursor to jump to the next joining point between two blocks to the left. That spot will become the centre of the view. Pressing the tab multiple times, results in multiple jumps through the blocks in the media file represented by the blocks. Tab right 34 does the same thing, halting at the end of the last block in the sequence.

The return to start button 22 works in fine edit mode 47 or in the build track 4. Pressing the button causes the cursor to jump to the very start of the time line 2.

Zooming in to see more detail in a waveform view is accomplished either with a tool button, or for touch-screen devices, may be done with a touch 'gesture'. For example, zooming in on the iPhone™ is accomplished with the standard iPhone™ "pinch" gesture (placing the tip of thumb and forefinger on the screen and drawing the tips towards each other while maintaining contact until the screen). The amount of zoom in or out will be proportional to the distance of the finger movements, up to the limits of the screen view capabilities. Panning of a waveform timeline to the right or left on a touch-screen device can also be accomplished by conventional iPhone™ gestures. When the user wants to move quickly through a long audio recording, the user may use scrolling. This works in the same way one can scroll through a long contact list in the 'contacts' program on an iPhone™ 3G Version 2.1, that is touching a finger to an area of the waveform in the source track 3, and "Flicking" it in either direction. The waveform will scroll rapidly in that direction, and gradually come to a halt. Touching a finger to the source track 3 stops the panning when desired. On devices without such gesture commands, GUI provides a 'panning' command button.

The Super Cursor allows the user to use this single device to pan through the media waveform; to highlight portions of the waveform; and to 'scrub' through the media, i.e. to listen/watch the audio/video while pulling the cursor to the right.

The triangle tab 8 is used to move the supercursor. The user presses, holds and drags the tab to the left or right. If the cursor is moved to the edge of the screen, the waveform will begin scrolling through the time line 2 at faster than normal playing speed.

The cursor can also be moved, without touching the cursor itself. To jump to a new spot, the user touches a finger to the timeline at the top of the source track 3. The cursor will appear in that spot.

To play media, the user presses the track they want to hear/watch. Whichever track was last pressed is then played, or 'armed'. The user presses the Play button 20 to start, and presses Play again to Pause. Only the audio/video in the selected track will be heard/seen. To Fast Forward, the user presses Play button 20 and hold. The media will play at 1.7 times normal speed for five seconds, and will then play at double normal speed.

The scrub tool 10 is another way to move and to hear/watch the media, while selecting an edit point. To use scrubbing, the user presses and holds the circular tab at the bottom of the supercursor 6. Pulling to the right plays the media at slower than normal speed, for example, three-quarters normal speed for five seconds, and then up to normal speed. Pulling to the left moves the cursor in reverse, but the media will not play. If the user pulls the scrub tool 10 to the right edge of the screen, the waveform and timeline will scroll, and the audio will play faster than normal, for example at 1.7 times normal speed for five seconds, and then double speed.

To stop scrolling with the scrub tool 10, the user pulls back in the opposite direction and let's go. The media playback will stop, and the cursor will stay where the user left it.

Scrub tool 10 may be used on both the source track 3 in build mode 1, and in fine edit mode.

Finding the exact spot for an edit can be difficult even on a full-sized computer screen; much more difficult on the mobile computing device such as the iPhone™ screen, which is only 3.5 inches on the diagonal. The Play Around the cursor button 22 may be used to make it easier. Once the user has placed the cursor 6 roughly where they want it, they can press the play around cursor button 22 to help find the best edit point. The user zooms in to the cursor and presses the Play Around button. A 'ghost playhead' will appear, and will play the media three seconds before and three seconds after the spot the cursor is placed. Use the triangle tab 8 as usual to move the cursor to the best edit point.

A simple way to select a desired clip from the source track is to use the super cursor 6 controls. The user presses Play to hear/watch the media, and selects the beginning or 'In Cue' 68 for the clip, uses the triangle tab 8 to drag the cursor to the exact spot, presses and holds the diamond tab 9, and then drags to the right to wherever the end of the clip is to be, that is, the Out Cue 69. A second cursor appears, and, instead of diamonds, there are two triangular flags 68, 69 pointing toward each other. The area between the two flags or cursors is highlighted 57. To deselect an area, the user presses a finger on the waveform anywhere outside the highlighted area. Cursor 6 then returns to start point. To move a clip from the source track 3 to the build track 4, the user presses and holds a finger to the highlighted portion of the waveform 57, and pulls down to the build track 4. Clip will then be copied to the build track 4. The clip 7, shown as a corresponding block 7a, then resiliently 'bungees' to the beginning of the build track 4, for example the left hand side of the build track, or to the end of the sequence of blocks 7.

Mark mode 23 is used in cases when the size of the clip to be selected is large, and the end points cannot be easily seen within the waveform window. It allows the user to select an in-cue point 68, and then move to the end of the desired clip, and then set an out-cue point 69. Everything between those points is highlighted 57.

Mark mode 23 works in both the source track 3, and the build track 4. Due to the limited display size on the mobile computing device such as the iPhone™, the present invention GUI provides a "mark mode 23", which causes the program to switch into a mode that only deals with setting the mark in 40 and mark out 41. Some other commands and functions do not work in this mode and will be "grayed out", with the exception of moving through the interface, zooming, delete, and playback functions.

The cursor 6 also acts differently in the mark mode. When in mark mode 23, the cursor at the beginning of the clip will not move until mark mode is exited. As well, the "play around cursor" function will only play around the out cue, not the in cue, until mark mode is exited. The area between the two cursors will remain highlighted 57 until mark mode is exited by pressing the mark mode 23 button. This allows the user to highlight an area 57, without worrying about losing the first in cue 68. To select a clip with mark mode 23, the user first positions the supercursor 6 at the beginning of the area the user wants highlighted. Then, the user presses the mark mode button 23. This allows the user to freely position the second mark out cursor 69, without any fear of accidentally moving the first mark in cursor.

There are several ways to position the mark out cursor 69. The user may pull on the diamond tabs 9 of supercursor 6, and scroll through the timeline, by flicking it, and then touch the top of the track at the timeline 2, at which point the mark out cursor 69 will appear. The user can then do a more accurate placement by zooming in and using the diamond tab 9 or scrub tool 10, then use the scrub tool 10 to play through the media. When in mark mode 23, the scrub tool 10 highlights the waveform as it moves, just as the diamond tabs 9 do. Play 20 is used to simply play to the point where the clip is to end.

Once the media is highlighted in source track 3, it can be pulled down in direction A to the build track 4 as usual. It will copy, generate a block 7a and then bungee or snap to the beginning of the track, or until it hits the next block 7a in line. Pressing the Mark Button 23 again exits Mark Mode. The area of audio highlighted will remain in place, but ordinary functions now return.

If the area outside the highlighted waveform is pressed, the highlight will disappear, and the process will have to be repeated.

The scrub tool 10 may be used to set both the in cue 68 and the out cue 69. To do this, the scrub tool 10 is used to find the start point of a clip. The user presses mark mode 23, and then scrubs to the desired point in the media to end the clip. The clip is now highlighted. With mark mode 23, the first in cue 68 will not disappear, even as the user scrubs through the audio. Pressing mark mode 23 button again will cause the program to exit mark mode. The user presses the waveform outside the highlighted area to un-highlight an area.

As stated above, when clips 7 are first copied to the build track 4, their corresponding blocks 7a automatically move to the beginning of the build track, in the order they are copied. This is called a 'bungee'. The user merely pulls down and let's go. The block icon appears to resiliently bungee into position in direction B. Once the clips are on the build track 4, they can be moved with a simple press and drag.

Again, as stated above, to change the order of blocks, the user drags one block over the other. When the block being moved goes halfway over the adjoining block, the two blocks will swap positions. At times, the user may want to move two blocks apart, leaving only silence in the middle.

To move a block away from another, the user presses and holds the block with one finger, and also press and hold a second finger to the build track 4. The block may then be dragged along the build track, and will not bungee back to its starting point.

To move several blocks, the same technique applies. The user presses two fingers to build the track, with one on the block furthest to the left, drags to the right, and all of the blocks will move to the right. Any block to the left of where the user places a finger will not move.

The combined effect of the aforementioned features and tools combined in the preferred embodiment of the present invention result in an intuitive and easy to use audio editor that fits and works well on a small format touch-screen mobile computing device, as well as a full desktop computing system.

In the case of video editing, video blocks are created by using a 'mark in' and 'mark out' approach on a video player, with the marks made on a timeline display.

Each block snapping into place at the right side of the block before it.

The blocks are moved around by simply pressing and dragging the blocks over each other. As each block is dragged over the other, they exchange their order automatically, and again snap into place.

Once these blocks or clips are in the desired order, the user may then switch to the fine edit mode, which in the case of video always shows a multitrack view. The top track shows the chosen video clips along a standard timeline.

However, if the user is satisfied with the video created by simply moving the blocks in order, the video may now be rendered. The software identifies where each video clip begins and ends, and renders only those sections of video just before and just after the 'split' between two sections; in essence, stitching the two sections together at the break.

One advantage of this system of editing is that it allows the user to easily select blocks of audio or video, to move them into the desired order very quickly, and to be able to see several long blocks of video or audio on the screen at one time, despite the very small size of the device and its screen.

Figure 18:
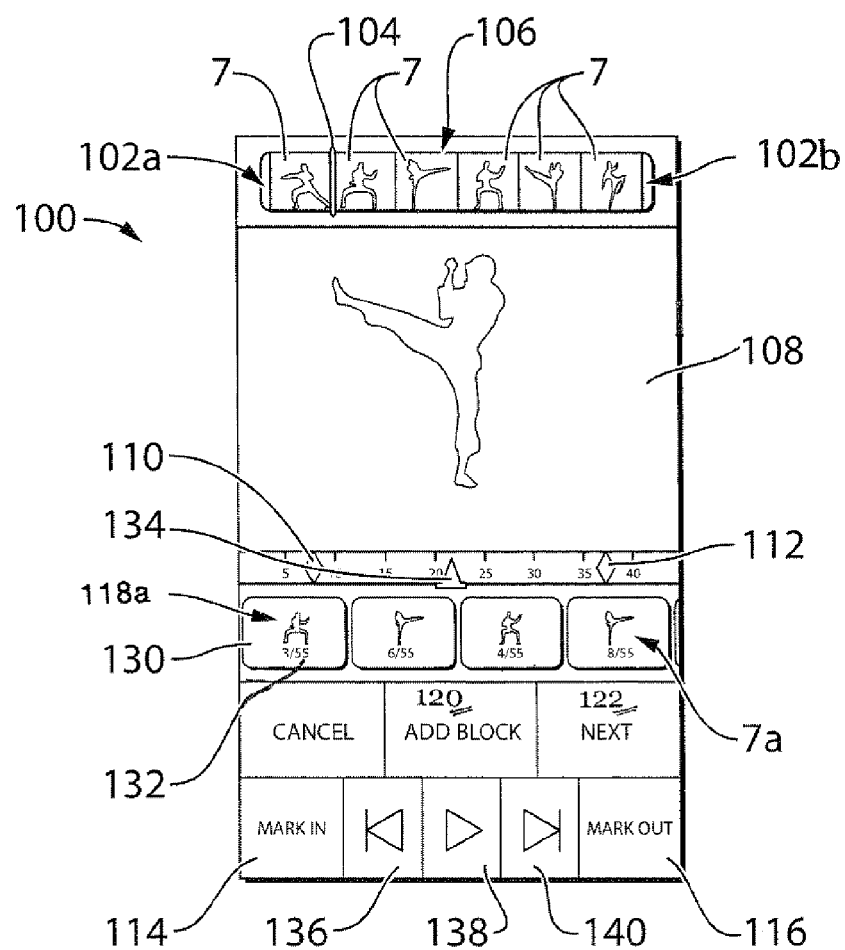
FIG. 18 is an illustrative view of a build screen while editing a video file.
Figure 19:
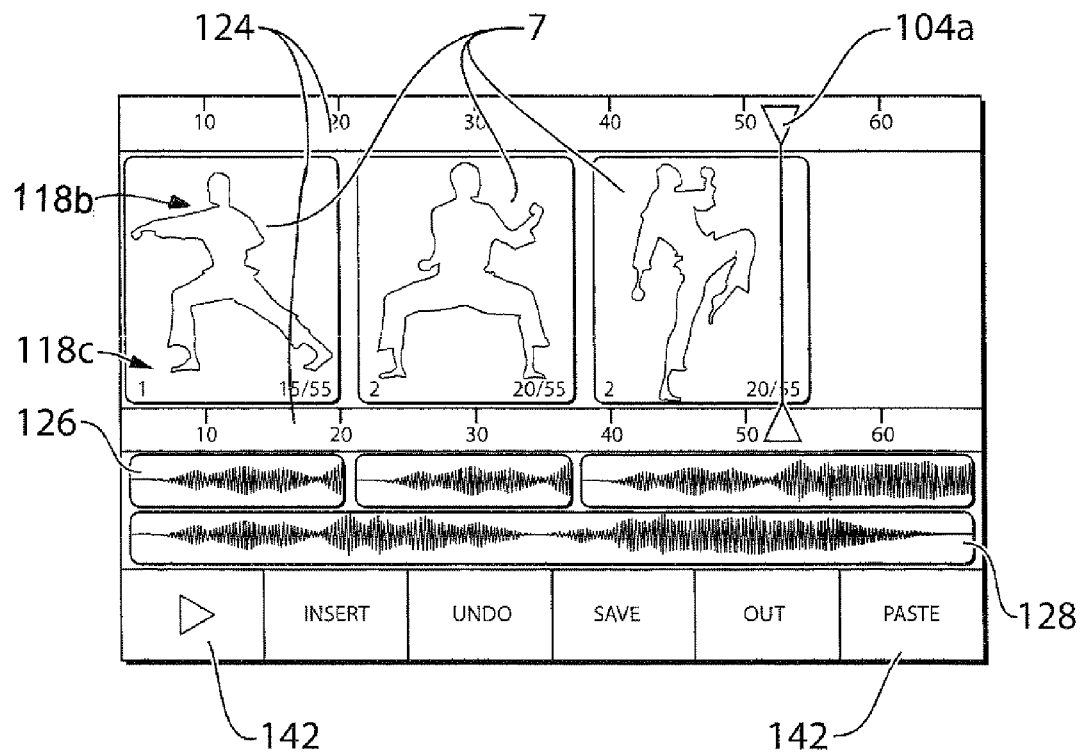
FIG. 19 is an illustrative view of a timeline screen during the editing of the video file of FIG. 18.

In the video GUI embodiment of FIGS. 18 and 19, as found on screen 100 of a small mobile computing device, the user uses trim tab left 102a and trim tab right 102b to pull on the "tab" for trimming or shortening the video clip 7 from the beginning or from the end respectively from the clip. Pulling the cursor 104 along the scrub tool 106 allows the user to see the video images being played out rapidly on the player window 108, in forward or reverse. Cursor 104 shows the position of play back in the current video clip. This in essence is setting the "in" and "out" markers, 110 and 112 respectively. When an in-mark 110 is set using either the scrub tool 106 with the trim tab left 102a, or the in-mark button 114, this indicates the location of the resulting in-mark or in-cue. When an out-mark 112 is set using the scrub tool 106 with the trim tab right 102b or the out-mark button 116, this indicates the location of the resulting out-mark or out-cue.

A thumbnail image 118a appears on each bungee block 7a showing the first frame of the video clip represented by the bungee block, making it easier for the user to identify which video clip 7 the user is working with.

When the user identifies the section of video they want, that is, once an in-cue and an out-cue are set to the users satisfaction, the user presses the add block button 120 to create and add a first bungee block 7a or a further bungee block 7a if there are already existing bungee blocks 7a, representing that section of video selected. The GUI creates the small bungee block 7a icon which the GUI presents to the user as appearing to either snap to the left side of the screen, or, if a different bungee block has already been added, then to the right side of the right-most existing block. Each subsequent bungee blocks snaps in place to the right of the one before it, and continues scrolling off to the right side of the screen. Each block may be moved by the user pressing the block and pulling the block, that is dragging the block in the desired left or right direction relative to the other blocks. When a block is pulled more than half way across an adjacent block, the two blocks exchange their place in the order presented.

Pressing the next button 122 takes the user to the time-line editing screen of FIG. 19 where the bungee blocks 7a are seen by the user expanded along a time-line 124. Two additional tracks for editing audio are provided: an associated audio track 126 and an unassociated audio track 128. The associated audio track 126 is the audio that was recorded along with the video. Putting the associated audio on a separate track allows the user to edit the audio separately from the video. The unassociated audio track 128 is audio recorded separately from the video but imported to form a sound bed for the video.

The length indicator 130 shows the length of an individual bungee block in seconds. The total length indicator 132 shows the length in seconds of all the blocks created and present for manipulation, that is, which have been created but not deleted. As each block is added or subtracted, this value changes, showing whatever the present current length is, as represented by the bungee blocks.

The mark in button 114 sets in the in-mark or in-cue, as the video is played at the current location of the cursor 134. The mark out button 116 sets the out-mark or out-cue as the video is played at the current location of the cursor 134. The back one frame button 136 moves the cursor and the video image back one frame. The play/pause button 138 plays or pauses the playback in the player window 108. The forward button 140 moves the cursor and the video image forward one frame.

The time-line indicator 124 in the time-line screen of FIG. 19, shows the length of the audio and video in seconds and minutes. Video clips 7 between the time-line indicators 124 show the result of the edits made to the source video file which created the bungee blocks on the build screen of FIG. 18. Each clip 7 shows a thumbnail image 118b from the first frame of the represented video, and also a number 118c indicating in what order the clips were created, and, again, two numbers 130, 132 which show the length of the clip and the length of all the video clips presently available for manipulation in the project. Cursor 104a shows where playback will start, if the user plays the video, or shows where an edit decision will be made. Cursor 104a may also be split by the user using a "pinch and spread apart" gesture with the users fingertips, thereby allowing the user to highlight a portion of the video and/or audio. A selection of conventional editing tools 142 are provided across the bottom of the touch-screen for use in editing of both the audio and video tracks.

The applicants have personal knowledge of the process of editing video and audio for the purpose of creating, for example, news stories for television. One of the difficulties in editing video is that one requires a great deal of screen space to see the entire length of the video and the audio, in order to combine the two together along a timeline. This is not possible on a small screen, such as is commonly seen in a smart phone or PDA. It is difficult even on a large computer screen, and for this reason, video editors commonly use two separate large screens to perform this work The common practice is to first record an audio track, which would be the reporter's voice. This audio track then has to be combined with the video, which would usually have been recorded earlier.

The audio recording of the reporter's voice is usually played along with the video, as the reporter describes what is happening in the story. There are usually then 'clips' of interviews, in which the video and the audio are the same; for example, the video is showing the interview subject speaking.

The difficulty is in precisely matching the length of video to the length of audio, especially on a small screen. The current invention solves this problem through the Bungee Block solution.

When the user has created the audio, the user will know the length of time for each segment in which the reporter is speaking. So, in the example of FIG. 20, the first segment might be 20 seconds in length, before the segment featuring the interview subject.

In this case, the user would highlight small sections of video, and transform them into bungee blocks, and continue doing so, until the user has reached 20 seconds in length. This is done through the time code on each block, as they are created, creating a cumulative running total.

Under this scheme, the first block might be eight seconds in length. The first block would read:
"8/8"

When the second block is created, it would change the running total for both blocks, thus:
"8/12", "4/12"

When the third block is created, the running total would change for all three blocks, thus:
"8/18", "4/18", "6/18"

Finally, a fourth block is created, and the running total would change for all four blocks, thus:
"8/20", "4/20", "6/20", "2/20"

At this point, the user could then select the actual interview clip (in this example, a 10 second interview clip, transform it into a bungee block, and drop it into the sequence, thus:
"8/30", "4/30", "6/30", "2/30", "10/30"

This sequence can be continued until the entire sequence is complete. When it is complete, the entire sequence can be viewed in the timeline editor, which will show the video on the top track; the audio associated to the video on the middle track, and the audio recorded separately (in this case, the reporter's voice track) is on the bottom track.

The timeline editor allows the user to choose which audio track can be heard at any given time, and thus, the user can run the voice track only for the first 20 seconds, and then switch to the associated audio (in this case, the interview clip) for the next 10 seconds.

The block system has a second advantage, in that it allows the user to much more rapidly change the sequence in which the video clips appear.

The process in video editing for news is generally that the user knows there is a certain length of audio, in this case 20 seconds, and the user must select exactly the length of video required to 'cover' that audio.

In the above description, the bungee blocks can be seen as a rapid way to select the necessary video to 'cover' the audio as it is referred to in journalism editing. However, having selected the video clips, the user will also likely want to change the order of the clips in order to correspond to what the reporter is saying at a given time.

In a typical timeline editor, the user would usually have to 'cut' a section of video, and then insert or 'paste' it elsewhere in the timeline. This is difficult in a small screen device, since the user may not always be able to see all of a long clip, without zooming in and out.

Bungee blocks 7a allow the user to simply drag and drop the clips in to the desired order.

To do this, the user simply presses and holds a stylus or finger to the bungee block, and drags it over the block adjacent. The blocks will automatically switch places, and snap, ie be pulled hands-free, back into place. The length of the video will not change at all.

In addition, there are numbers on each block which identify the block in the order it was created. So, if the user dragged the fourth block to precede the third block, the block would still be identified as the fourth block, even though it is now third in the sequence of blocks. This allows the user to keep track of which clip is which, without having to continually replay or preview the video represented by that block.

In addition, the blocks may be different colours, depending on which source they are drawn from. So, the blocks drawn from the reporter's voice track might be blue, while the interview blocks might be green. This allows the user to identify quickly what subject matter is represented by each block.

This process greatly speeds the editing process, particularly on a small screen device, a representation of this example is seen in FIG. 20.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A computer-implemented method for editing digital media on a portable digital processing device having a touch-screen display, comprising:
    displaying an interface of a media editing application on the touch-screen display, wherein the interface includes:
        a source media track displaying a source media depiction along a source media timeline,
        a viewer screen,
        a supercursor, and
        a build track for bungee block icons representing selected clip portions of the source media depiction;
    selecting a first clip portion of the source media depiction;
    in response to a touch-and-drag gesture applied to said first clip portion towards the direction of said build track, generating a first bungee block icon and initially displaying said first bungee block icon at a first position substantially adjacent to said source media timeline;
    snapping said first bungee block icon across said screen to a starting queue position of said build track so that during said snapping said first bungee block icon appears to be pulled hands-free across said screen from substantially said first position to said starting queue position;
    selecting a second clip portion of the source media depiction;
    in response to a touch-and-drag gesture applied to said second clip portion towards the direction of said build track, generating a second bungee block icon and initially displaying said second bungee block icon at substantially said first position;
    snapping said second bungee block icon to a second queue position adjacent said first bungee block icon at said starting queue position; and
    after said first and second bungee block icons are in said build track, moving said first or second bungee block icon relative to the other substantially along said build track, and, if said first or second bungee block icon overlaps the other by greater than or substantially equal to one half of said other bungee block icon, reversing the queue positions of said first and second bungee block icons,
    wherein the selection of each of the first and second clip portions includes:
        selecting, via a first selection touch-screen gesture involving the supercursor, an in-cue at a first timeline position along the source media timeline, and
        selecting, via a second selection touch-screen gesture involving the supercursor, an out-cue at a second timeline position along the source media timeline.

2. The method of claim 1, further comprising:
    providing, on each of said first and second bungee block icons, a corresponding clip length indicator.

3. The method of claim 2, further comprising:
    providing, on each of said first and second bungee block icons, a total clip length indicator.

4. The method of claim 3, further comprising:
    providing, on each of said first and second bungee block icons, a thumbnail image from the corresponding clip portion.

5. The method of claim 1, further comprising
    positioning said source media track between said source media timeline and said build track, and wherein said source media timeline is adjacent and parallel to said source media track.

6. The method of claim 5, wherein said source media track, said source media timeline and said build track are provided depicted horizontally across said touch-screen display.

7. The method of claim 6, wherein said first and second bungee block icons have a uniform size relative to each other, so that at least several uniformly sized bungee block icons are viewable simultaneously on said touch-screen display when displayed on said build track.

8. The method of claim 7 further including detecting a touch-and-drag gesture applied to a block icon-to-be-moved on said build track, detecting a release location where said touch-and-drag gesture is released, comparing said release location to locations of remaining block icons of said several uniformly sized block icons on said build track and said snapping so as to insert said block icon-to-be-moved between a closest adjacent pair of said remaining block icons if said block icon-to-be-moved is substantially equi-distant between them, and otherwise said snapping said block icon-to-be-moved to a distal end of said build track distal from said starting position.

9. The method of claim 8 including repeating the step of generating said block icons for all desired media clips from said source media, and repeating the step of applying said touch and drag gesture to said block icons on said build track and re-arranging the order of said block icons on said build track as desired so as to edit an edited version of said source media.

10. The method of claim 9 further including providing a change-screen button depicted on said touch-screen display to change said touch-screen display to display a timeline editor, detecting a designation touch gesture against one of said block icons on said build track, and a subsequent touch gesture against said change-screen button, and then displaying a second application interface displaying a timeline based media editor for editing a source media clip associated with said one of said block icons so designated.

11. The method of claim 10 further including editing said one of said block icons while in said media editor in said second application interface and, when complete, returning from said second application interface to said first application interface.

12. A portable multi-function device for editing digital media on a portable digital processing device having touch-screen display, comprising:

one or more processors;

memory storing one or more programs configured to be executed by said one or more processors, wherein said one or more programs include instructions for:
- displaying an interface of a media editing application on the touch-screen display, wherein the interface includes:
  - a source media track displaying a source media depiction along a source media timeline,
  - a viewer screen,
  - a supercursor, and
  - a build track for bungee block icons representing selected clip portions of the source media depiction;
- selecting a first clip portion of the source media depiction;
- in response to a touch-and-drag gesture applied to said first clip portion towards the direction of said build track, generating a first bungee block icon and initially displaying said first bungee block icon at a first position substantially adjacent to said source media timeline;
- snapping said first bungee block icon across said screen to a starting queue position of said build track so that during said snapping said first bungee block icon appears to be pulled hands-free across said screen from substantially said first position to said starting queue position;
- selecting a second clip portion of the source media depiction;
- in response to a touch-and-drag gesture applied to said second clip portion towards the direction of said build track, generating a second bungee block icon and initially displaying said second bungee block icon at substantially said first position;
- snapping said second bungee block icon to a second queue position adjacent said first bungee block icon at said starting queue position; and
- after said first and second bungee block icons are in said build track, moving said first or second bungee block icon relative to the other substantially along said build track, and, if said first or second bungee block icon overlaps the other by greater than or substantially equal to one half of said other bungee block icon, reversing the queue positions of said first and second bungee block icons,
- wherein the selection of each of the first and second clip portions includes:
  - selecting, via a first selection touch-screen gesture involving the supercursor, an in-cue at a first timeline position along the source media timeline, and
  - selecting, via a second selection touch-screen gesture involving the supercursor, an out-cue at a second timeline position along the source media timeline.

13. The device of claim 12 further comprising instructions for:
providing, on each of said first and second bungee block icons, a corresponding clip length indicator.

14. The device of claim 13, further comprising instructions for:
providing, on each of said first and second bungee block icons, a total clip length indicator.

15. The device of claim 14, further comprising instructions for:
providing, on each of said first and second bungee block icons, a thumbnail image from the corresponding clip portion.

16. The device of claim 15, further comprising instructions for:
positioning said source media track between said source media timeline and said build track, and wherein said source media timeline is adjacent and parallel to said source media track.

17. The device of claim 16, further comprising instructions for:
depicting said source media track, said source media timeline and said build track horizontally across said touch-screen display.

18. The device of claim 17 further comprising instructions for:
said first and second bungee block icons have a uniform size relative to each other, so that at least several uniformly sized bungee block icons are viewable simultaneously on said touch-screen display when displayed on said build track.

19. The device of claim 18 further including instructions for detecting a touch-and-drag gesture applied to a block icon-to-be-moved on said build track, detecting a release location where said touch-and-drag gesture is released, comparing said release location to locations of remaining block icons of said several uniformly sized block icons on said build track and said snapping so as to insert said block icon-to-be-moved between a closest adjacent pair of said remaining block icons if said block icon-to-be-moved is substantially equi-distant between them, and otherwise said snapping said block icon-to-be-moved to a distal end of said build track distal from said starting position.

20. A graphical user interface for editing digital media on a portable multifunction device, the interface comprising:
- a touch-screen display;
- an interface of a media editing application on the touch-screen display, wherein the interface includes:
  - a source media track displaying a source media depiction along a source media timeline,
  - a viewer screen,
  - a supercursor, and
  - a build track for bungee block icons representing selected clip portions of the source media depiction;
- wherein the following functions are performed via the interface:
  - selecting a first clip portion of the source media depiction;
  - in response to a touch-and-drag gesture applied to said first clip portion towards the direction of said build track, generating a first bungee block icon and initially displaying said first bungee block icon at a first position substantially adjacent to said source media timeline;
  - snapping said first bungee block icon across said screen to a starting queue position of said build track so that during said snapping said first bungee block icon appears to be pulled hands-free across said screen from substantially said first position to said starting queue position;
  - selecting a second clip portion of the source media depiction;
  - in response to a touch-and-drag gesture applied to said second clip portion towards the direction of said build track, generating a second bungee block icon and initially displaying said second bungee block icon at substantially said first position;
  - snapping said second bungee block icon to a second queue position adjacent said first bungee block icon at said starting queue position; and after said first and second bungee block icons are in said build track, moving said first or second bungee block icon relative to the other substantially along said build track, and, if said first or second bungee block icon overlaps the other by greater than or substantially equal to one half of said other bungee block icon, reversing the queue positions of said first and second bungee block icons, wherein the selection of each of the first and second clip portions includes:

selecting, via a first selection touch-screen gesture involving the supercursor, an in-cue at a first timeline position along the source media timeline, and selecting, via a second selection touch-screen gesture involving the supercursor, an out-cue at a second timeline position along the source media timeline.

21. The interface of claim 20, wherein the following functions are performed via the interface:

providing, on each of said first and second bungee block icons, a corresponding clip length indicator.

22. The interface of claim 21, wherein the following functions are performed via the interface:

providing, on each of said first and second bungee block icons, a total clip length indicator.

23. The interface of claim 22, wherein the following functions are performed via the interface:

providing, on each of said first and second bungee block icons, a thumbnail image from the corresponding clip portion.

24. The interface of claim 23, wherein the following functions are performed via the interface:

positioning said source media track between said source media timeline and said build track, and wherein said source media timeline is adjacent and parallel to said source media track.

25. The interface of claim 24, wherein said source media track, said source media timeline and said build track are provided depicted horizontally across said touch-screen display.

26. The interface of claim 25, wherein said first and second bungee block icons have a uniform size relative to each other, so that at least several uniformly sized bungee block icons are viewable simultaneously on said touch-screen display when displayed on said build track.

27. The interface of claim 26 further including detecting a touch-and-drag gesture applied to a block icon-to-be-moved on said build track, detecting a release location where said touch-and-drag gesture is released, comparing said release location to locations of remaining block icons of said several uniformly sized block icons on said build track and said snapping so as to insert said block icon-to-be-moved between a closest adjacent pair of said remaining block icons if said block icon-to-be-moved is substantially equi-distant between them, and otherwise said snapping said block icon-to-be-moved to a distal end of said build track distal from said starting position.

28. The interface of claim 27 including repeating the step of generating said block icons for all desired media clips from said source media, and repeating the step of applying said touch and drag gesture to said block icons on said build track and re-arranging the order of said block icons on said build track as desired so as to edit an edited version of said source media.

* * * * *